US011971936B2

(12) United States Patent
Bakir et al.

(10) Patent No.: US 11,971,936 B2
(45) Date of Patent: Apr. 30, 2024

(54) ANALYZING WEB PAGES TO FACILITATE AUTOMATIC NAVIGATION

(71) Applicant: GOOGLE LLC, Mountain View, CA (US)

(72) Inventors: Gökhan Bakir, Zurich (CH); Andre Elisseeff, Basel (CH); Torsten Marek, Zurich (CH); João Paulo Pagaime da Silva, Adliswil (CH); Mathias Carlen, Zurich (CH); Dana Ritter, Horgen (CH); Lukasz Suder, Zurich (CH); Ernest Galbrun, Mulhouse Haut-Rhin (FR); Matthew Stokes, Langnau am Albis (CH); Marcin Nowak-Przygodzki, Bäch (CH); Mugurel-Ionut Andreica, Adliswil (CH); Marius Dumitran, Buchare (RO)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/974,086

(22) Filed: Oct. 26, 2022

(65) Prior Publication Data

US 2023/0050054 A1 Feb. 16, 2023

Related U.S. Application Data

(63) Continuation of application No. 16/619,777, filed as application No. PCT/US2019/031529 on May 9, 2019, now Pat. No. 11,487,832.

(Continued)

(51) Int. Cl.
*G06F 16/00* (2019.01)
*G06F 16/9032* (2019.01)
*G06F 16/9535* (2019.01)

(52) U.S. Cl.
CPC .... *G06F 16/9535* (2019.01); *G06F 16/90332* (2019.01)

(58) Field of Classification Search
CPC .......... G06F 16/9535; G06F 16/90332; G06F 16/9532; G06F 40/35
(Continued)

(56) References Cited

U.S. PATENT DOCUMENTS 6,192,380 B1 2/2001 Light et al.
7,676,829 B1 3/2010 Gui et al.
(Continued)

FOREIGN PATENT DOCUMENTS

CN 102349087 2/2012
CN 103370701 10/2013
(Continued)

OTHER PUBLICATIONS

The Korean Intellectual Property; Notice of Office Action issued in Application No. 10-2021-7008316; 8 pages; dated Dec. 5, 2022.
(Continued)

*Primary Examiner* — Michelle N Owyang
*Assistant Examiner* — Shirley D Hicks
(74) *Attorney, Agent, or Firm* — Gray Ice Higdon

(57) ABSTRACT

Implementations are described herein for analyzing existing interactive web sites to facilitate automatic engagement with those web sites, e.g., by automated assistants or via other user interfaces, with minimal effort from the hosts of those websites. For example, in various implementations, techniques described herein may be used to extract, validate, maintain, generalize, extend and/or distribute individual actions and "traces" of actions that are useable to navigate through various interactive websites. Additionally, techniques are described herein for leveraging these actions and/or traces to automate aspects of interaction with a third
(Continued)

party website. For example, in some implementations, techniques described herein may enable users to engage with an automated assistant (via a spoken or typed dialog session) to interact with the third party website without requiring the user to visually interact with the third party web site directly and without requiring the third party to implement their own third party agent.

20 Claims, 14 Drawing Sheets

Related U.S. Application Data

(60) Provisional application No. 62/737,822, filed on Sep. 27, 2018.

(58) Field of Classification Search
USPC ............................................. 707/600–899
See application file for complete search history.

(56) References Cited

U.S. PATENT DOCUMENTS

| | | | |
|---|---|---|---|
| 8,510,237 | B2 | 8/2013 | Cascaval et al. |
| 8,826,398 | B2 | 9/2014 | Karp |
| 9,189,254 | B2 | 11/2015 | Kushman et al. |
| 9,600,456 | B2 | 3/2017 | Sriganesh et al. |
| 9,852,286 | B2 | 12/2017 | Aguilar-Macias et al. |
| 2007/0226783 | A1 | 9/2007 | Mimlitsch |
| 2008/0010258 | A1 | 1/2008 | Sureka |
| 2008/0120257 | A1* | 5/2008 | Goyal ................... G06F 40/174 706/12 |
| 2010/0174758 | A1 | 7/2010 | Radenkovic et al. |
| 2012/0016678 | A1 | 1/2012 | Gruber et al. |
| 2016/0246885 | A1 | 8/2016 | Aravamudhan |
| 2018/0061400 | A1 | 3/2018 | Carbune et al. |
| 2018/0061401 | A1* | 3/2018 | Sarikaya ............... G06F 40/205 |
| 2018/0349447 | A1 | 12/2018 | Maccartney et al. |
| 2020/0342039 | A1 | 10/2020 | Bakir et al. |

FOREIGN PATENT DOCUMENTS

| | | |
|---|---|---|
| CN | 103473291 | 12/2013 |
| CN | 105247511 | 1/2016 |
| CN | 106250412 | 12/2016 |
| CN | 106462608 | 2/2017 |
| CN | 107209762 | 9/2017 |
| CN | 107481719 | 12/2017 |
| CN | 108027738 | 5/2018 |
| CN | 108205467 | 6/2018 |
| CN | 108351870 | 7/2018 |
| JP | 2002175285 | 6/2002 |
| JP | 2003271643 | 9/2003 |
| JP | 2017521739 | 8/2017 |
| JP | 2017523492 | 8/2017 |

OTHER PUBLICATIONS

European Patent Office; Summons to attend oral proceedings issued in Application No. 19726825.3; 16 pages; dated Jan. 13, 2023.
European Patent Office; Intention to Grant issued in Application No. 19726825.3; 72 pages; dated Mar. 27, 2023.
Liu, E. et al. "Reinforcement Learning on Web Interfaces Using Workflow-Guided Exploration;" Cornell University; www.arXiv.org; arXiv:1802.08802v1; 15 pages; Feb. 24, 2018.
Shi, T. et al. "World of Bits: An Open-Doman Platform for Web-Based Agents;" In Proceedings of the 34th International Conference on Machine Learning; vol. 70; Sydney, Australia; 10 pages; Aug. 6, 2017.
European Patent Office; International Search Report and Written Opinion of Ser. No. PCT/US2019/031529; 18 pages; dated Aug. 7, 2019.
European Patent Office; Communication Pursuant to Article 64(3) EPC issued in Application No. 19726825.3; 10 pages; dated Sep. 16, 2021.
Intellectual Property India; Examination Report issued in Application No. IN202127011198; 10 pages; dated Feb. 7, 2022.
Japanese Patent Office; Notice of Reasons for Rejection issued in App. No. 2021-516651, 4 pages, dated Jul. 4, 2022.
European Patent Office; Intention to Grant issued for Application No. 19726825.3, 69 pages, dated Sep. 25, 2023.
China National Intellectual Property Administration; Notification of First Office Action issued in Application No. 201980063632.3; 18 pages; dated Feb. 8, 2024.
Hongwei, L. et al.; Identifying User Interests Based on Browsing Behaviors; Data Analysis and Knowledge Discovery; vol. 2, No. 2; 12 pages; dated Feb. 25, 2018.
Yu, H. et al.; IPTV Video Personalized Recommendation Scheme; vol. 33, No. 12; 9 pages; dated Dec. 20, 2017.
Xiao, S. et al.; Optimal Device Choice and Media Display: A Novel Multimedia Exhibition System Based on Multi-terminal Display Platform; Procedia Computer Science, vol. 129; 7 pages; dated Apr. 13, 2018.

* cited by examiner

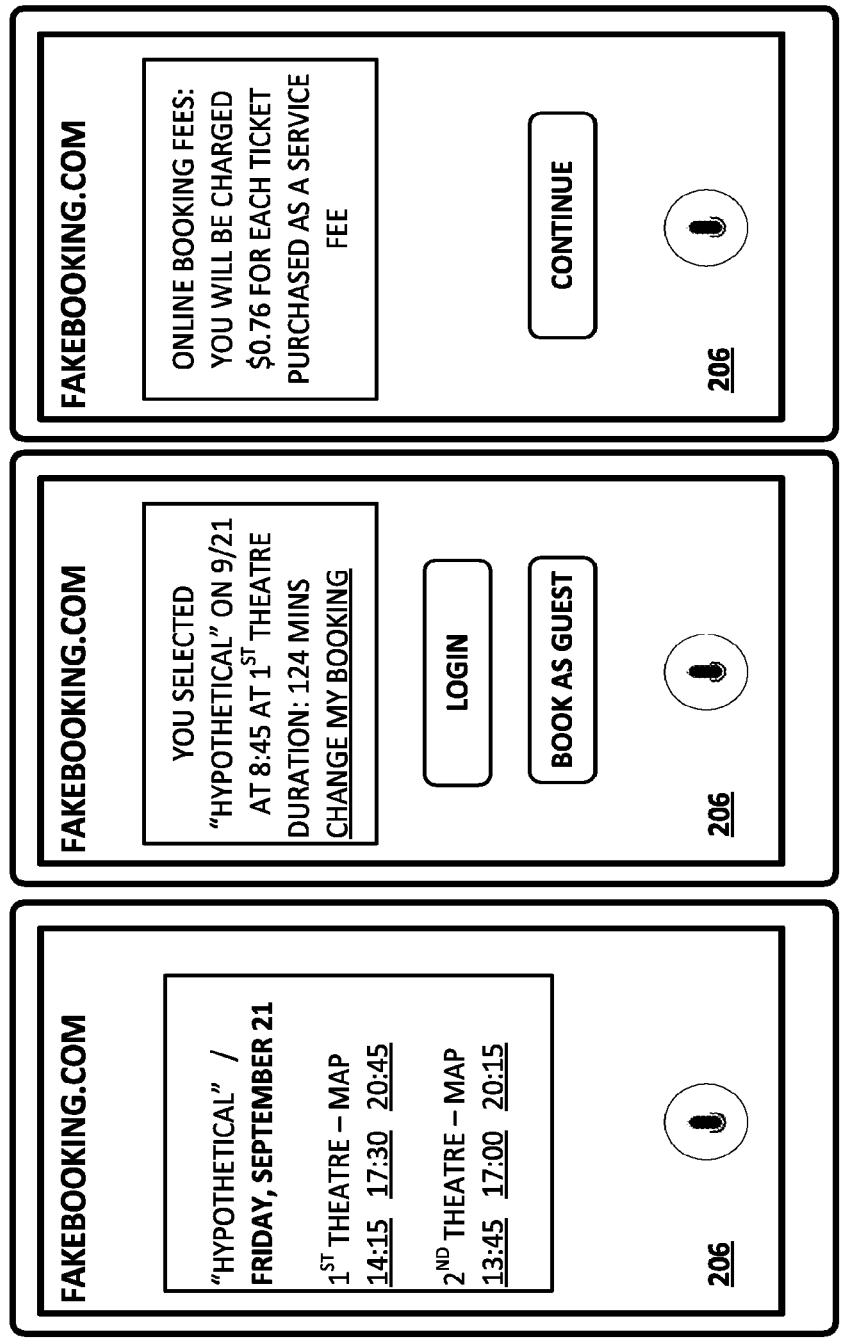

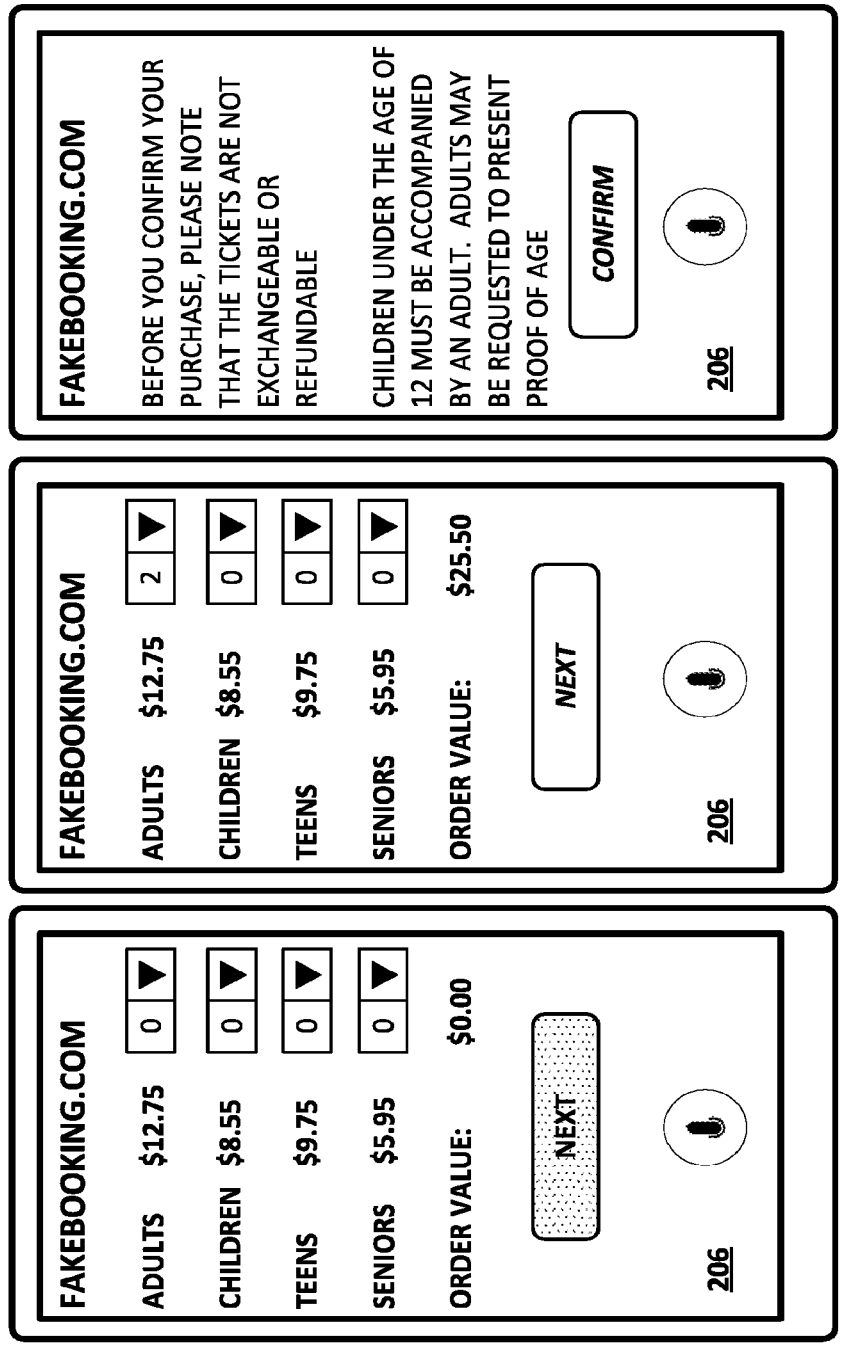

```
//Returns the cell index from a (x,y) point inside the grid. When (x, y) is outside the grid, the returned
index is negative.
int GetIndex(Point p);

// Returns the center of the cell with index cell_index.
Point GetCenter(int cell_index);

// Returns the list of terms in the cell
std::vector<string> GetTerms(int cell_index);
```

The distance is then computed as:

```
Input: Nx and Ny, two neighborhoods to compare.
       alpha, a small positive number representing the cost of having more terms Output: a measure of a distance of Ny to Nx (asymmetric).

Algorithm:

double distance = 0;
for(int i =0 ; i < Ny.cell_size() ; i++) {
    int j = Gridx.GetIndex(Ny.GetCenter(i));
    // Compute the terms in Nx but not in Ny.
    distance += alpha * SetDiff(Nx.GetTerms(j), Ny.GetTerms(i)).size();
    // Compute the terms in Ny but not in Nx.
    distance += SetDiff(Ny.GetTerms(i), Nx.GetTerms(j)).size();
}
return distance;
```

Fig. 7

```
Input: distance matrix d of distance between two Neighboods Nx (size n) and Ny (size p). D is
       represented as a vector of size n*p.

Output: a double describing how dissimilar Nx and Ny are.

Algorithm:

std::vector<pair<double, int>> d_with_index;
for(int i=0; i<d.size(); i++){
  d_with_index.emplace_back(d[i],i);
}
// sort in ascending order
sort(d.begin(), d.end(), [] (const auto& x, const auto& y) { return x.first > y.first; });
std::unordered_set<int> done_nx;
std::unordered_set<int> done_ny;
double distance = 0;
for(int i =0; i <d.size(); i++) {
  int index_nx = d.second % p;
  int index_ny = d.second / p;
  if (ContainsKey(done_nx, index_nx)) {
    // index_nx already assigned
    continue;
  }
  if (ContainsKey(done_ny, index_ny)) {
    // index_ny already assigned
    continue;
  }
  distance += d[i];
  done_ny.insert(index_ny);
  done_nx.insert(index_nx);
}
```

Fig. 8

ANALYZING WEB PAGES TO FACILITATE AUTOMATIC NAVIGATION

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," "virtual assistants," etc.). For example, humans (which when they interact with automated assistants may be referred to as "users") may provide commands, queries, and/or requests (collectively referred to herein as "queries") using free form natural language input which may include vocal utterances converted into text and then processed and/or typed free form natural language input. Automated assistants may perform various types of processing on the natural language input, such as natural language processing, syntactic processing, semantic processing, etc., in order to identify and respond to the user's intent.

Automated assistants may interact with third party software agents, or "third party agents," in order to respond to some types of user intents to which the automated assistant itself is unable to respond fully. For example, vendors such as restaurants, ride share services, and so forth, may design their own third party agents that are configured to interact with an application programming interface ("API") of an automated assistant, e.g., so that the automated assistant can act as a liaison between the user and the third party agent. However, this development paradigm can be slow to scale. Each vendor must first create a third party agent that is compatible with the automated assistant's API. This may require more resources and/or technical sophistication than many vendors may have at their disposal. Moreover, many vendors already have built interactive web pages and/or mobile applications ("apps") that users can interact with to procure various items and/or services. Requiring these vendors to design yet another interface that is compatible with automated assistants may result in what appears, at least from the vendor's perspective, to be duplication of efforts.

SUMMARY

Techniques are described herein for analyzing existing interactive web sites (including individual HTML, XML, CSS and/or JavaScript web pages that form those web sites) to facilitate automatic engagement with those web sites, e.g., by automated assistants or via other user interfaces, with minimal effort from the hosts of those websites (e.g., vendors). For example, in various implementations, techniques described herein may be used to extract, validate, maintain, generalize, extend and/or distribute individual actions and "scripts" of actions (i.e. sequences of actions) that are useable to navigate through various interactive websites. Additionally, techniques are described herein for leveraging these actions and/or traces to automate aspects of interaction with a third party website. For example, in some implementations, techniques described herein may be employed to enable users to engage with an automated assistant (via a spoken or typed dialog session) to interact with the third party website without requiring the user to visually interact with the third party web site directly and without requiring the third party to implement their own third party agent.

Suppose a user requests that an automated assistant perform some action (e.g., procure an item or service) using some vendor. Suppose further that the particular vendor has not yet created a third party agent with which the automated assistant can interact with directly, but that the vendor does have an interactive website with a series of web pages, each with one or more interactive elements, that are operable by a user to procure the item or service. Using techniques described herein, the first web page of the interactive web site (i.e., the opening web page) may be analyzed and/or processed to generate a current user state associated with the user. This current user state may be represented in various ways, such as a semantically-rich feature vector, an embedding in latent space, etc. The current user state may also include other information, such as one or more parameters provided by the user (e.g., as part of their natural language input), one or more preferences of the user (e.g., preferred pizza toppings or crust style), previous actions by the user (e.g., how did the user get here, prior searches from the user, prior requests to the assistant, active topics of conversation with the automated assistant, prior user states, etc.), and so forth. In some implementations, the current user state may also include one or more what will be referred to herein as "universal identifier matrices" that include contextual clues about each interactive element (e.g., radio button, input field, submit button, search button, drop down list, seating chart, etc.) of the current web page. Universal identifier matrices will be explained in more detail shortly.

In various implementations, the current user state may be compared to a plurality of past user states contained in one or more databases, e.g., to identify one or more candidate user states. These past user states may represent user states generated during previous interactions with the same web site or different web site(s), and may include similar information as is included in the current user state. These past user states may also include associated actions that correspond to interactive elements being acted upon during the previous interactions, such as checking one or more radio boxes, selecting a particular item on a drop-down menu, filling in a particular input field with a particular parameter, etc.

The candidate user states may be identified based on a variety of criteria. For example, in some implementations, the candidate user states may be identified from a larger superset of past user states based on measures of similarity (e.g., Euclidian distance, similar universal identifier matrices, etc.) between them and the current user state. In some implementations, only those past user states with similarity measures to the current user state that satisfy some similarity threshold may be considered candidate user states (i.e., to reduce the search space from all past user states, which may grow large over time). One benefit of using similarity measures is that the candidate user states are likely going to be similar to the current user state. Consequently, actions that were undertaken successfully on the web pages used to generate the candidate past user states are likely to be successful for the current user state.

Once the candidate user state(s) are identified, in some implementations they may be ranked, e.g., based on their respectively similarity measures to the current user state, based on similarities between their respective universal identifier matrices and those of the current web page on which the current user state is generated, etc. Then, the top-ranked candidate user state may be selected, and one or more actions associated with the top ranked state may be performed, e.g., to interact automatically (i.e., without explicit user input) with one or more interactive elements of the current web page. If the one or more performed actions prove unsuccessful, in some implementations, the next highest ranked candidate user state may be selected, and one or more of its associated actions may be performed, and so on. In some implementations, the success or failure of a particular candidate user state may be used as a signal, e.g., to rank that candidate user state amongst other candidate user states moving forward.

Successful performance of action(s) associated with a candidate user state may correspond to if the user had interacted with the web page to input values into all the required interactive elements and pressed "submit." In the web page context, the user's browser would be directed to a next web page in one or more scripts of web pages that form the interactive website, at which point the user may be asked to provide additional input at one or more additional interactive elements. Similarly, in the context of the present disclosure, after successful performance of action(s) associated with one candidate user state, the current user state may be updated based on a next web page in the script of interactive web pages of the interactive website. Then, the process may repeat. Candidate user states may be identified that are most similar to the updated current user state (i.e., that correspond to when the user reaches the second web page using a browser). These updated candidate user states may or may not be ranked, and action(s) associated with one or more of the updated candidate user states may be performed until action(s) associated with one of the updated candidate user states are successful. This process may continue until the transaction is complete, i.e., until the automated assistant has successfully navigated an entire script through the interactive website and the desired item or service is procured.

Additionally or alternatively, in some implementations, the process of automatically navigating websites using techniques described herein may operate similarly to reinforcement learning. With reinforcement learning, a current state is examined according to a policy (e.g., a neural network or other statistical model) to select from a plurality of candidate actions. Similarly, with techniques described herein, the current user state may be examined in accordance with one or more policies to select one or more actions to perform. For example, in some implementations, once a current user state is generated, all validated actions (process of validating actions and scripts will be described shortly) may be available. However, there may be an enormous number of potential actions, and the vast majority of them may not be relevant to the current user state (e.g., actions relating to procuring movie tickets may not be relevant in the context of trying to procure a ride share). Accordingly, in various implementations, a policy may exist that effectively narrows down the list of available actions to those that make sense with regard to the current user state. For example, in some implementations, the applicable policy may rank available actions based on their fitness to the current user state. The highest ranked actions may be attempted first (e.g., in the order of their ranking) until one or more of the performed actions achieve success (e.g., navigate to a next web page of a script).

On interactive web pages (e.g., HTML, XML, etc.), an HTML or XML node (e.g., an interactive element) can typically be identified by a human from the set of terms and/or images surrounding it. Otherwise it would be hard for a user to identify what to read or where to click after the page has been scrolled slightly up or down. In other words, each interactive element of a web page has its own "visual" or "geometrical" context.

Techniques described herein leverage these geometrical contexts in order to be able to adapt to new websites and/or to update scripts through previously-analyzed websites. As noted previously, in some implementations, "universal identifier matrices" may be generated for each interactive element in a web page (the current web page under consideration and/or web pages used to generate past user states). The universal identifier matrix for a given interactive element may include data indicative of both the given interactive element (e.g., its type, such as drop down menu, input box, radio button, etc.) and of other visible content of the web page that immediately surrounds the given interactive element when the web page is rendered (e.g., as it would be rendered in a web browser application). In other words, the universal identifier matrix provides a "visual" or "geometrical" context for each interactive element of the web page, similar to a visual/geometrical context that would be seen/understood by a human being. The term "universal" refers to the independence of the universal identifier matrix from the underlying document object model ("DOM") tree.

There are various benefits to segmenting interactive elements into universal identifier matrices. While web pages may change over time, the individual interactive elements, and their geometrical context within the rendered web pages (e.g., what text or other DOM elements they appear close to, below, above, etc.), may remain relatively constant. Consequently, when a web page is changed, it is possible to locate the same interactive elements at their new locations and/or in their new arrangements based on contextual clues provided by their respective universal identifier matrices. The same actions may then be performed on these same interactive elements as were performed prior to the web page's alterations.

Universal identifier matrices may take various forms. In some implementations they may be defined as a set of <location, text> pairs associated with a given interactive element. <location> may be the position relative to the center of a bounding rectangle (or other shape) that is centered on the interactive element of interest. Each element surrounding the interactive of element of interest may be classified by its location relative to the interactive element. For example, <(−10, 10): "first", "name"> may refer to the text "first name" being located ten pixels (or other distance unit) to the left, and ten pixels (or other distance unit) above, the interactive element of interest. When comparing two universal identifier matrices constructed in this way, the distances between the various pairs may be computed to determine an overall similarity between the two universal identifier matrices.

Another less granular approach is to define a universal identifier matrix as a grid of n cells (e.g., three-by-three, or nine cells) in which the center cell contains the interactive element of interest, and the surrounding cells include pieces of web page content immediately surrounding the interactive element of interest. Comparing universal identifier matrices constructed from such grids may scale linearly with the number of cells in the grids.

As noted previously, a database of past user states (and their corresponding actions) may be available for comparison with a current user state. These past user states may be generated, or "learned," in various ways. For example, they may be generated based on interaction between actual human users and web pages (i.e., the corpus of past user states may be bootstrapped from a finite number of human interactions). Additionally or alternatively, they may be generated based on automated interaction with web pages.

However, as mentioned previously, web pages may change over time, e.g., due to new features being added, aesthetic updates, etc. Accordingly, in various implementations, the past user states may be periodically "validated" or "tested" to ensure that, for instance, they still serve as part of a valid script through a respective interactive website. For example, a uniform resource locator ("URL") associated with a previously learned web page may be used to reload the web page periodically (e.g., hourly, daily, weekly, etc.). One or more universal identifier matrices previously generated from prior version(s) of the web page may be compared to universal identifier matrices generated from the updated web page, e.g., to develop a mapping between the previously-known universal identifier matrices and those of the updated web page. If the web page has changed substantially enough, it may not be possible to create adequate mappings, and the past user state associated with the URL may be flagged as no longer valid (or simply dropped from the database in some cases).

On the other hand, if the mappings between the old universal identifier matrices and the new universal identifier matrices are successfully identified, in various implementations, various actions associated with the past user state may be performed to determine whether they are still valid with respect to the updated web page. If the same or similar actions are still performable, then the updated web page may be considered validated. In some cases a new user state may be generated for the updated web page and stored in the database for future use. If the same or similar actions are no longer successfully performable, the past user state associated with the URL may be flagged as no longer valid (or simply dropped from the database in some cases).

In some implementations, when selecting an action to be performed for a given candidate state, another criterion may be considered. For example, in some implementations, only those actions associated with universal identifier matrices that can be matched to universal identifier matrices of the current web page may be performed, or may be performed before other potential actions. Additionally or alternatively, in some implementations, when a successful navigation or "trace" is detected through a series of web pages forming a website (whether the successful trace was generated by a human or automatically using techniques described herein), that trace may be persisted, e.g., in association with actions that are associated with the individual user states generated from that trace. Those actions may thereafter be deemed as "validated" and may be favored over other actions for which validation has not yet occurred, or at least hasn't occurred as frequently or recently.

As noted previously, input elements of web pages may be operable by a user to provide parameters, such as pizza toppings, movie theatre/airplane seat selections, ride share destinations, etc. Many of these parameters may be provided by the user up front when engaging with the automated assistant. For example, the user may say something like, "OK Assistant, order me a thin crust pepperoni pizza from Hypothetical Pizza Shop." Assuming Hypothetical Pizza Shop does not have an active third party agent to interface with the automated assistant directly, techniques described herein may be employed to automatically navigate through Hypothetical Pizza Shop's interactive website to procure the pizza as requested. However, suppose the user didn't provide a parameter that is required in order to complete the order. These missing parameters may be acquired in various ways.

In some implementations, aspects of the user's profile, such as the user's preferences (e.g., learned from a history of computing interactions of the user) or other information associated with the user's profile may be used to fill in the blanks. For example, Hypothetical Pizza Shop's website might require a delivery address. Rather than soliciting the user for that information, the user's address may be determined automatically, e.g., from his or her profile and/or based on a position coordinate provided by a device carried by the user. In some implementations, the user's address may be baked into his or her current user state. This information may then be used to auto-populate an address field of Hypothetical Pizza Shop's website without the user having to providing this information manually.

However, some missing parameters may not be fillable automatically from a user's profile and/or history. For example, suppose a user tends to use multiple different payments methods for procuring goods or services. The user may not wish for the automated assistant to "guess" which payment the user would like to use to pay for the pizza, or the user's preferred payment method may not be accepted by Hypothetical Pizza Shop. Or, there may be other required parameters for ordering pizza that the user didn't specify, and that aren't discernable from her profile (e.g., interest in a special, does she want drinks, etc.). In some implementations, the automated assistant may pause traversal through Hypothetical Pizza Shop's website in order to solicit these missing parameters from the user, e.g., on an as-needed basis. However, the user may still not need to physically interact with the website—the automated assistant may do that on the user's behalf.

In some implementations, a method performed by one or more processors is provided that includes: receiving a natural language input from a user at an input component of a computing device, wherein the natural language input is directed by the user to an automated assistant that operates at least in part on the computing device; analyzing the natural language input to identify an intent of the user and one or more parameters associated with carrying out the intent of the user; obtaining a web page that includes one or more interactive elements, wherein the web page is operable to carry out the intent of the user and the one or more interactive elements are operable to input one or more of the parameters; determining a current user state associated with the user, wherein the current user state is determined based at least in part on content of the web page; identifying, from a database of past user states, based on the current user state, one or more candidate past user states, wherein each of the one or more candidate past user states includes one or more candidate actions for interacting with one or more of the interactive elements of the web page, wherein the one or more candidate actions were previously validated as capable of carrying out at least part of the intent; selecting, from the one or more candidate past user states, based at least in part on a first criterion, a particular candidate past user state; selecting, from the one or more candidate actions, based at least in part on a second criterion, associated with the selected candidate past user state, a particular candidate action; performing the selected candidate action to interact with one or more of the interactive elements of the web page using one or more of the parameters; and providing, by the automated assistant as audio or visual output to the user, natural language output indicating that at least part of the intent of the user has been carried out.

In various implementations, the method may further include identifying the web page based on one or more of the natural language input, the intent of the user, or the one or more parameters. In various implementations, each of the one or more candidate actions may have been previously validated as compatible with the same web page. In various implementations, each of the one or more candidate actions may have been previously validated as compatible with a different web page that is operable to carry out a corresponding intent.

In various implementations, the first criterion may include the current user state and the selected candidate past user state having a greatest a similarity measure. In various implementations, determining the current user state may include generating, for each of the one or more interactive elements of the web page, a universal identifier matrix that includes data indicative of both the respective interactive element and of other visible content of the web page that immediately surrounds the respective interactive element when the web page is rendered. In various implementations, the identifying may include comparing the one or more universal identifier matrices generated from the web page with one or more other universal identifier matrices associated with each of the one or more candidate past user states. In various implementations, the identifying may include comparing, for each given candidate past user state of the one or more candidate past user states, the one or more universal identifier matrices generated from the web page with one or more other universal identifier matrices corresponding to the one or more candidate actions associated with the given candidate past user state.

In various implementations, the method may further include ranking the one or more candidate actions associated with the given candidate past user state based on the comparing. In various implementations, the universal identifier matrix may include one or more tuples, wherein each of the one or more tuples may include a piece of content from the web page and a geometrical location of the piece of content relative to the underlying respective interactive element that was used to determine the universal identifier matrix. In various implementations, the universal identifier matrix may include a two-dimensional grid of cells, wherein a central cell of the two-dimensional grid of cells may correspond to the underlying respective interactive element that was used to determine the universal identifier matrix, and one or more of the two-dimensional grid of cells that surround the central cell may correspond to other pieces of content from the web page.

In another aspect, a method implemented using one or more processors may include: determining an identifier of a web page, wherein the identifier was previously validated to indicate that the web page was last known be operable to carry out an intent of a user, and wherein the web page was last known to include a first set of one or more interactive elements that were known to be operable to input one or more parameters associated with the intent; retrieving an updated version of the web page based on the identifier; analyzing the updated version of the web page to identify a second set of one or more interactive elements; generating, based on the second set of one or more interactive elements identified from the updated version of the web page, an updated set of corresponding universal identifier matrices that each includes data indicative of both the respective interactive element of the second set and of other visible content of the web page that immediately surrounds the respective interactive element when the web page is rendered; determining a mapping between the updated set of universal identifier matrices and a known set of universal identifier matrices generated based on the first set of one or more interactive elements last known to be included with the web page; based on the mapping, attempting actions that were previously performed on the first set of one or more interactive elements on one or more corresponding interactive elements of the second set; and based on one or more outcomes of the attempting, selectively classifying the identifier of the web page as validated or invalidated. In various implementations, validated web page identifiers may be available to facilitate natural language-based automated navigation through websites that include web pages associated with the validated web page identifiers.

In various implementations, the identifier of the web page may include a uniform resource locator ("URL"). In various implementations, each given universal identifier matrix of the updated set may include one or more tuples, wherein each of the one or more tuples may include a piece of content from the updated version of the web page and a geometrical location of the piece of content relative to the underlying interactive element that was used to determine the given universal identifier matrix. In various implementations, each given universal identifier matrix of the updated set may include a two-dimensional grid of cells, wherein a central cell of the two-dimensional grid of cells may correspond to the underlying interactive element that was used to determine the given universal identifier matrix, and one or more of the two-dimensional grid of cells that surround the central cell may correspond to other pieces of content from the updated version of the web page. In various implementations, the validated web page identifiers may be available to an automated assistant to facilitate the natural language-based automated navigation through the websites that include the web pages associated with the validated web page identifiers.

In another aspect, a method implemented using one or more processors may include: obtaining a unknown web page that includes one or more interactive elements, wherein the unknown web page is operable to carry out at least a portion of a procurement and the one or more interactive elements are operable to input one or more parameters for carrying out the at least portion of the procurement; generating, based on the one or more interactive elements of the unknown web page, a corresponding first set of one or more universal identifier matrices, wherein each universal identifier matrix of the first set includes data indicative of both the respective interactive element of the unknown web page and of other visible content of the unknown web page that immediately surrounds the respective interactive element when the unknown web page is rendered; identifying, from a database of past user states, based at least in part on the first set of universal identifier matrices, one or more candidate past user states, wherein each respective candidate past user state of the one or more candidate past user states includes one or more candidate actions for interacting with one or more interactive elements of a known web page used to generate the respective candidate past user state, and wherein a given candidate past user state of the one or more candidate past user states is identified based on a comparison of the first set of universal identifier matrices and a second set of one or more universal identifier matrices associated with the given candidate past user state; attempting one or more candidate actions associated with one or more of the candidate past user states on one or more of the interactive elements of the unknown web page; and based on one or more outcomes of the attempting, selectively classifying the unknown web page as validated or invalidated; wherein validated web pages are available to facilitate natural language-based automated navigation through websites that include the validated web pages.

In various implementations, the validated web pages may be available to an automated assistant to facilitate the natural language-based automated navigation through the websites that include the validated web pages. In various implementations, the method may further include generating a new user state in response to classifying the unknown web page as validated, wherein the new user state may be generated based on the unknown web page, and adding new user state to the database of past user states.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A, FIG. 2B, FIG. 2C, FIG. 2D, FIG. 2E, FIG. 2F, FIG. 2G, FIG. 2H, and FIG. 2I depict an example of a sequence of interactive web pages forming an interactive website.

FIG. 7 and FIG. 8 depict example pseudocode for implementing various types of universal identifier matrices, in accordance with various implementations.

DETAILED DESCRIPTION

Figure 1:
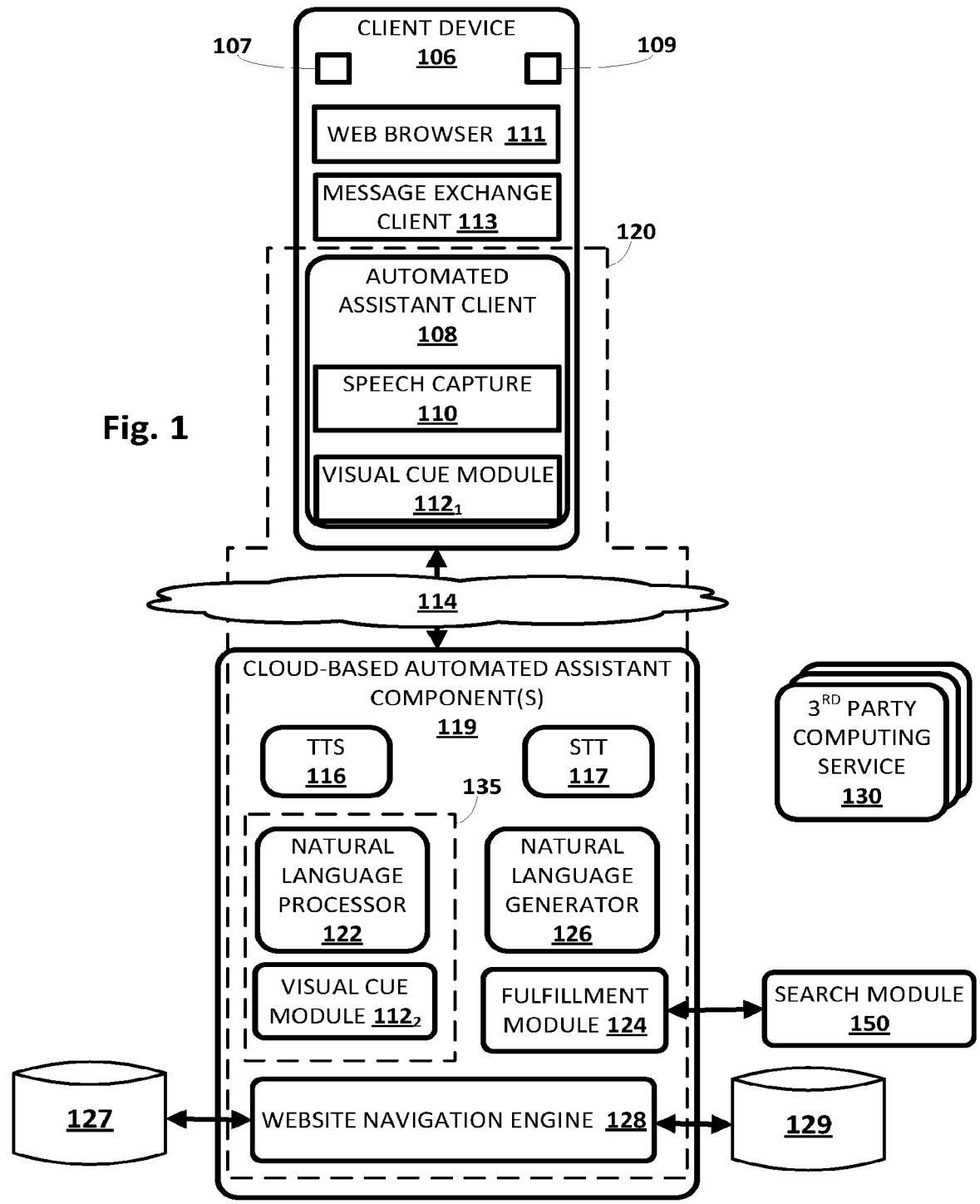
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used to capture image frames (still images or video) of an environment in which client device 106 is deployed. These image frames may then be analyzed, e.g., by a visual cue module $112_1$, to detect user-provided visual cues contained in the image frames. These visual cues may include but are not limited to hand gestures, gazes towards particular reference points, facial expressions, predefined movements by users, etc. These detected visual cues may be used for various purposes, such as invoking automated assistant 120 and/or causing automated assistant 120 to perform various actions.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant." When spoken, this verbal input may be captured by a microphone 109 and may cause automated assistant 120 to begin actively listening or monitoring typed text. Additionally or alternatively, in some implementations, automated assistant 120 may be invoked based on one or more detected visual cues, alone or in combination with oral invocation phrases.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110 and/or a visual cue module 112$_1$. In other implementations, one or more aspects of speech capture module 110 and/or visual cue module 112 may be implemented separately from automated assistant client 108, e.g., by one or more cloud-based automated assistant components 119. For example, in FIG. 1, there is also a cloud-based visual cue module 112$_2$ that may detect visual cues in image data.

In various implementations, speech capture module 110, which may be implemented using any combination of hardware and software, may interface with hardware such as microphone 109 or other pressure sensor to capture an audio recording of a user's utterance(s). Various types of processing may be performed on this audio recording for various purposes.

In various implementations, visual cue module 112$_1$ (and/or cloud-based visual cue module 112$_2$) may be implemented using any combination of hardware or software, and may be configured to analyze one or more image frames provided by vision sensor(s) 107 to detect one or more visual cues captured in and/or across the one or more image frames. Visual cue module 112$_1$ may employ a variety of techniques to detect visual cues. For example, visual cue module 112$_1$ (or 112$_2$) may use one or more artificial intelligence (or machine learning) models that are trained to generate output indicative of detected user-provided visual cues in image frames.

Client device 106 may have other applications installed as well, such as a web browser 111 and/or a message exchange client 113. Message exchange client 113 may come in various forms. In some implementations, message exchange client 113 may come in the form of a short messaging service ("SMS") and/or multimedia messaging service ("MMS") client, an online chat client (e.g., instant messenger, Internet relay chat, or "IRC," etc.), a messaging application associated with a social network, and so forth. In some implementations, message exchange client 113 may be implemented within a webpage rendered by web browser 111. In various implementations, message exchange client 113 may provide an interface for a user to engage in typed or spoken human-to-computer dialog with automated assistant 120, as a one-on-one dialog or as a multi-participant dialog in which automated assistant 120 may "participate." In some implementations, web browser 111 may be specially designed, e.g., with a microphone button or other user interface element that is operable to invoke automated assistant 120, so that the user is able to issue voice commands to aid in operation of web browser 111.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques. Additionally or alternatively, in some implementations, speech capture module 110 may be configured to convert text to computer-synthesized speech, e.g., using one or more voice synthesizers. However, in some cases, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based text-to-speech ("TTS") module 116 and/or a cloud-based STT module 117.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user. Free form natural language input may be spoken (and captured by microphone 109) and/or typed (e.g., into one or more interfaces provided by one or more applications, such as message exchange client 113).

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

An intent matcher 135 may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122 and the aforementioned cloud-based visual cue module $112_2$. In various implementations, cloud-based visual cue module $112_2$ may operate similarly to visual cue module $112_1$ except that cloud-based visual cue module $112_2$ may have more resources at its disposal. In particular, cloud-based visual cue module $112_2$ may detect visual cues that may be used by intent matcher 135, alone or in combination with other signals, to determine a user's intent.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from visual cue module (e.g., $112_1$ and/or $112_2$). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?"

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a latent space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected by visual cue modules $112_{1-2}$. For example, a user could utter something like "Order me this many cat bowls" while holding up three fingers to visual sensor 107 of client device 106. Or, a user could utter something like "Find me more movies like this" while holding of a DVD case for a particular movie.

Fulfillment module 124 may be configured to receive the predicted/estimated intent that is output by intent matcher 135, as well as an associated slot values (whether provided by the user proactively or solicited from the user) and carry out (or "resolve," or "fulfill") the intent. In various implementations, fulfillment (or "resolution" or "carrying out") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some Figs.) 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oregon." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Various aspects of the present disclosure may be implemented in whole or in part by website navigation engine 128. In general, website navigation engine 128 may be configured to analyze websites, particularly the constituent web pages of websites, in order to facilitate automated navigation through all or portions of these websites. More particular, website navigation engine 128 may analyze web pages and their constituent interactive elements to generate abstractions of these web pages for generation of user states. These user states may capture the underlying functionality of the web pages so that if these web pages are changed, it is still possible to navigate through them automatically. The user states also enable automated navigation through heretofore unknown websites based on their underlying functionalities being similar to previously validated/known websites.

Website navigation engine 128 may have access to multiple databases and/or indexes, such as a web page database 127. Web page data base 127 may include one or more databases of HTML, XML, PDF, or other documents that are generally available on the Internet using web browser 111 or other applications and are searchable using various search engines (not depicted).

Website navigation engine 128 also may have access to a database of past user states 129. Database of past user states 129 may store past user states and corresponding actions that may have be performed (or may be potentially performable) while those past user states were active. Sequences of interactive web pages forming an interactive website may be represented in database of past user states 129 as "scripts" of past user states and corresponding actions. The corresponding actions may be actions that are performable to interact with interactive elements of the web pages. Interactive elements may include but are not limited to radio buttons, toggle switches, check boxes, text input fields, drop down menus, sliders, and any other user interface element that is available using technologies such as HTML, XML, CSS, JavaScript, etc.

In some implementations, each script of past user states/corresponding actions may correspond to a particular website or web page identifier (e.g., a uniform resource locator or "URL", a domain name, an IP address, etc.). For example, one script may be associated with a pizza ordering website, another script may be associated with website that is operable by users to order various services (e.g., rideshare, lawn services, housekeeping services, haircut services, reservations, other types of appointments, etc.), and so on.

As will be described in more detail shortly, in some implementations, scripts of past user states/corresponding actions may be "validated," e.g., by a human or automatically by website navigation engine 128 using techniques described herein. To "validate" a script means to determine that the script is capable of carrying out a particular intent or purpose of the interactive website corresponding to the script. The process of validating a script may occur periodically (e.g., every N seconds, minutes, hours, days, weeks, etc., wherein N is a positive integer), on demand, etc.

User states may be generated from various information and may take various forms. As a non-limiting example, a past user state (and a "user state" more generally) may be a data structure such as a semantically rich feature vector, embedding, etc., that is generated at least in part based on content of a particular web page. Put another way, a past user state may represent, at least in part, an abstraction of a web page. In some implementations, this web page abstraction may include semantic and/or syntactic information extracted from the web page, and/or data abstractions representing interactive elements found on the web page, which in some implementations take the form of "universal identifier matrices" described herein. In various implementations, the universal identifier matrices generated from interactive elements of a web page may be baked into the past user state generated from the web page and/or represented as candidate actions associated with the past user state.

Various other data may also be baked into a user state, including actions performed previously during the sequence or "trace" of actions and/or parameters utilized in performance of those actions. As an example, take a user state that was generated from a second (or third, or beyond) successive web page of a sequence of web pages forming an interactive website. This successive user state ("successive" meaning it is not the opening user state associated with the interactive website) may include information extracted from the second successive (i.e. current) web page of the sequence, as well as information about previous past user states (e.g., indicative of previous web pages of the interactive website) and previous actions taken in association with those previous past user states. For example, if in a previous past user state an action was performed to populate an interactive element of a previous web page with a parameter such as "pepperoni," that previously-provided parameter may be baked into successive user state(s).

Additionally, in some implementations, various information about a user, e.g., obtained from a user's profile, may be included in a user state. For example, various user preferences, such as a preferred payment method, whether a user should be solicited for payment information at each transaction, a user's preferred seating position (e.g., aisle/window on an airplane, section of a movie theatre or sports event, etc., described in more detail shortly), preferred price ranges, or various other product- or service-specific parameters (e.g., vegetarian or vegan, smoking or nonsmoking, etc.) may be baked into a user state. Other user profile information that may be included in a user state include, but are not limited to, appointments on a user's electronic calendar (e.g., which may be used to automatically eliminate a movie show time if the user has a conflict), contents of electronic communications such as emails, text messages, etc. (including metadata associated therewith), social media posts (e.g., status updates, uploaded pictures, etc.), and so forth.

User preferences may be determined in various ways. In some implementations they may be set manually, e.g., using a graphical user interface or by a user telling automated assistant 120 of his or her preferences. Additionally or alternatively, in some implementations, some user preferences may be learned over time, e.g., based on user interaction with interactive websites, user interaction with automated assistant 120, etc. For example, suppose when purchasing goods or services using web browser 111, a user always clicks through confirmation screens relatively quickly (e.g., more quickly than would typically be required to fully consume whatever disclaimer or other language is presented). That may be taken into account in determining that the user is likely comfortable with those screens being automatically navigated through, e.g., by website navigation engine 128 and/or automated assistant, without requiring explicit input from the user.

Techniques described herein may even take into account other signals when determining whether to automatically navigate through confirmation pages. For example, suppose that when operating web browser 111, the user tends to click through these pages more quickly when the amount of money the user will spend is below a threshold, but the user tends to dwell on these confirmation pages when the amount of money to be spent is above the threshold. This threshold may be taken into account, e.g., by website navigation engine 128, when determining whether to automatically navigate through a particular confirmation web page without seeking explicit user input.

FIGS. 2A-I depict an example of a sequence or "trace" of web pages that may be interacted with by a user (not depicted) on a client device 206 to procure a good, in this case, two movie tickets from a hypothetical ticket purchasing website, fakebooking.com. Client device 206 in this example takes the form of a smart phone or tablet with a touch screen, but this is not meant to be limiting. In these examples, the user operates a web browser 111 of client device 206 to interact with the interactive website, but other applications could be used instead. For example, another application, such as message exchange client 113, may offer a "webview" feature in which it enables the user to interact with web pages, which are loaded into a webview of the application. In FIGS. 2A-I, a microphone icon may be operable by the user to invoke automated assistant 120 (or at least speech recognition) so that the user can give oral commands.

Suppose the user starts by provide the natural language input, "Tickets for 'Hypothetical' on Friday." In response to this request, in FIG. 2A, client device 206 receives and loads a first web page that provides show times for the requested movie on the requested date. In this example, the requested movie is playing at two theatres, with three show times at each theatre.

Suppose the user selects the "20:45" showing at "1$^{st}$ Theatre," e.g., by clicking on the time (which may be a selectable link). The next web page that is loaded is depicted in FIG. 2B. In FIG. 2B, the user is informed that he or she has selected "Hypothetical" on 9/21 at 8:45 (same as 20:45) at the 1$^{st}$ Theatre, and that the movie lasts 124 minutes. Now, the user is faced with two options: login to an existing account, e.g., with fakebooking.com, or book as a guest. Assuming the user logs in as a guest, the user will next be presented with the web page of FIG. 2C.

In FIG. 2C, the provided web page is a type of web page that is referred to herein as a "confirmation" web page. In a confirmation web page, the user is required to select some interactive element ("Continue" button in FIG. 2C) once the user has had time to consume whatever disclaimer or information is presented on the confirmation page. In FIG. 2C, for instance, the user is informed of a $0.76 fee charged for each ticket purchased. If the user selects the "Continue" button, the user may be presented with the web page depicted in FIG. 2D.

In FIG. 2D, the user is provided with a new interactive web page that includes pull down menus that allow the user to select how many tickets he or she would like to purchase, as well as a type of tickets (e.g., Adult, Children, Teens, Seniors, etc.). Each type of ticket has a different price. In FIG. 2D, the user has not yet interacted with the pull down menus. Consequently, the "Next" button is inactive as indicated by the shading. Once the user selects at least one ticket, this button may become activated. For example, in FIG. 2E, the user has selected two adult tickets. Consequently, the "Next" button is now activated and a total order value is also depicted. Once the user selects his or her desired tickets and operates the "Next" button, she may be taken to the web page depicted in FIG. 2F.

Figures 2G, 2H, 2I:
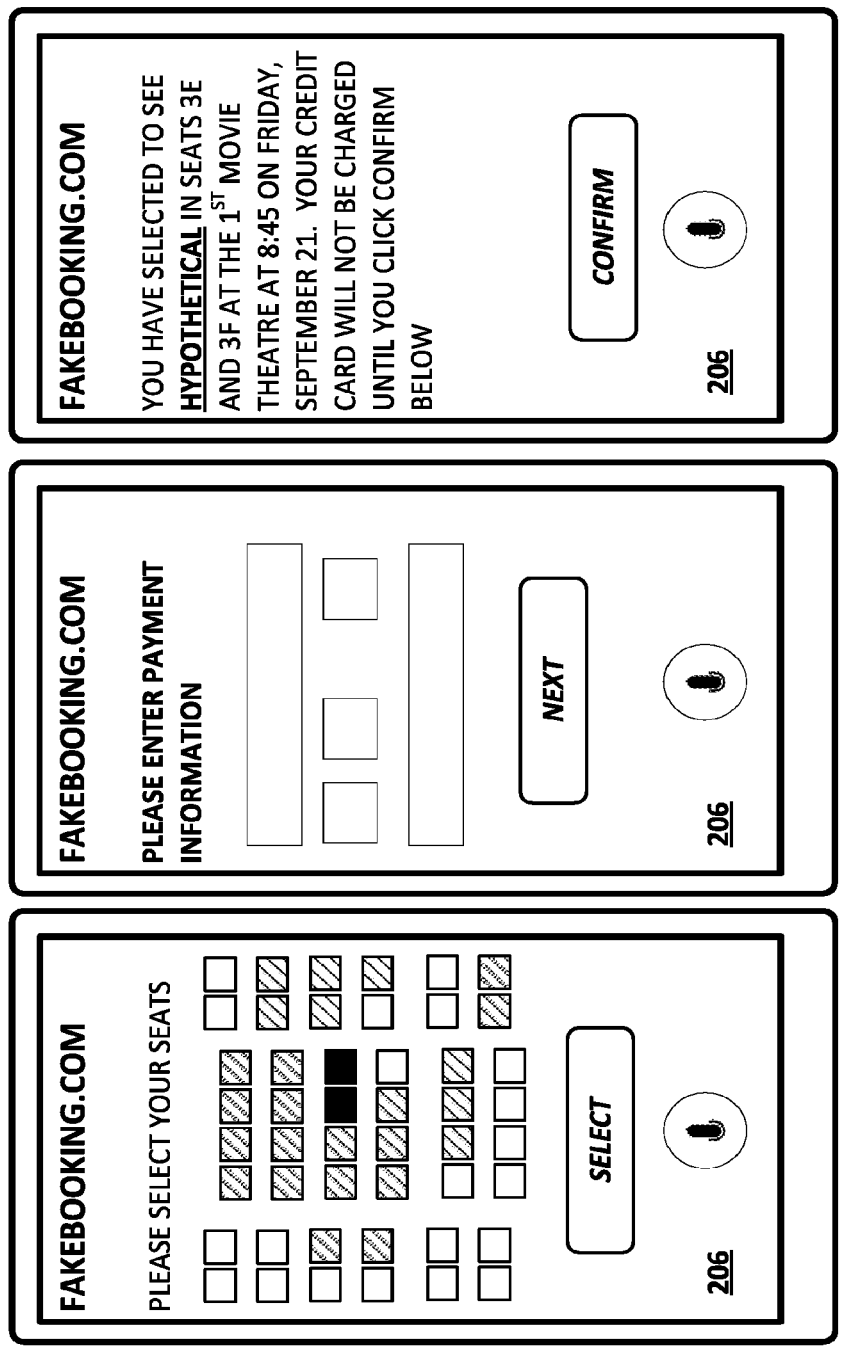

FIG. 2F depicts another confirmation web page. This time the user is informed that the tickets are nonrefundable and not exchangeable. The user is also provided other general information about children's admittance to the theatre, etc. Once the user clicks on the "Confirm" button, he or she may be presented with the web page of FIG. 2G.

In FIG. 2G, the user is presented with a web page that includes, as one or more interactive elements, a seating chart that the user can interact with to select seats. In FIG. 2G, the user has already selected two seats, as indicated by the black boxes. The white boxes represent still-available seats and the hatched boxes represent unavailable seats. Once the user selects seats (e.g., the same number of seats as tickets selected in FIG. 2E), the user may operate the "Select" button at bottom to go to the next screen.

In FIG. 2H, the user is presented with multiple interactive elements, primarily text input fields, which the user can interact with to provide payment information. Once the user enters valid payment information, the user may be taken to the web page of FIG. 2I. The web page of FIG. 2I is another, final confirmation page that summarizes the user's purchase and asks, one last time, for confirmation from the user. Once the user clicks "Confirm," the transaction may be complete. The user may receive tickets in various forms, such as in a text message or email, in the mail, etc.

As demonstrated from FIGS. 2A-I, the user is required to interact with nine different interfaces (web pages) in order to procure the desired good. This process may be cumbersome, especially if the user is physically disabled or otherwise unable to interact with a visual interface (e.g., because she only has a standalone interactive speaker available, because she is driving, etc.). Accordingly, techniques described herein, including techniques performed by aspects of automated assistant 120 and/or website navigation engine 128, make it possible to automatically navigate through interactive websites such as that depicted in FIGS. 2A-I, even if the proprietor of the website has not yet created a third party agent (e.g., 150 in FIG. 1) to laisse with automated assistant 120.

Figure 3C:
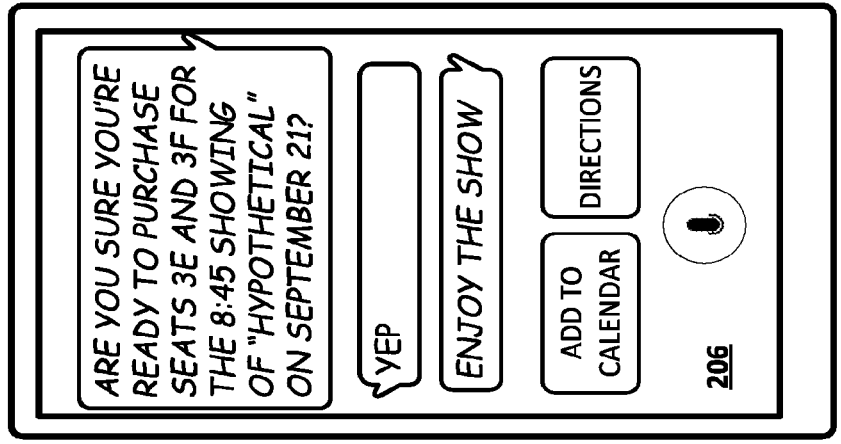
FIG. 3A, FIG. 3B, and FIG. 3C depict one example of how the sequence of interactive web pages of FIGS. 2A-I may be at least automatically navigated using disclosed techniques.
Figure 3B:
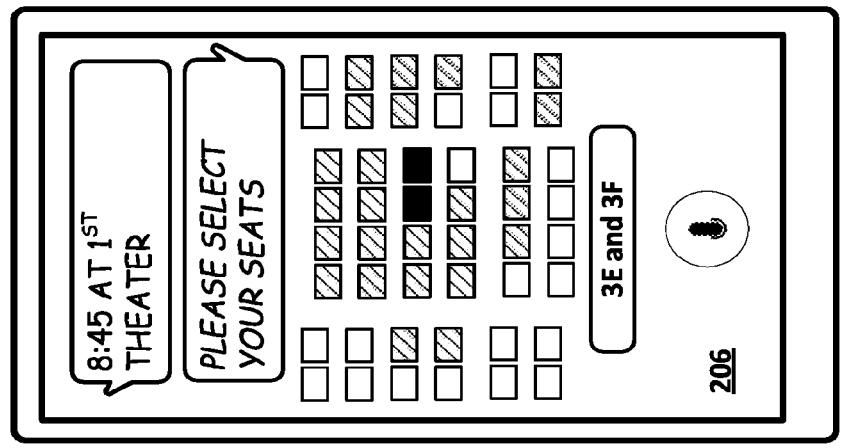
Figure 3A:
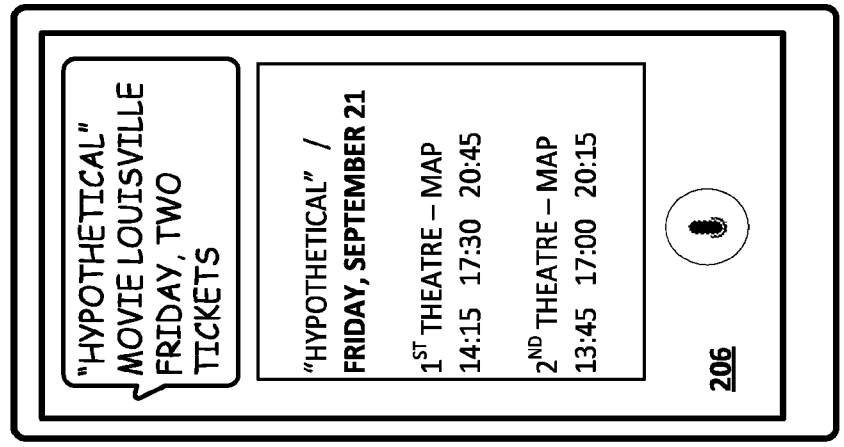

FIGS. 3A-C depict an example of how navigation through the same interactive website that was depicted in FIGS. 2A-I can be automated, in whole or at least in part, so that the user is able to procure goods and/or services more easily. In FIGS. 3A-C, the user interacts with the same client device 206 as was depicted in FIGS. 2A-I, but this is not meant to be limiting. For example, the interfaces and interaction depicted in FIGS. 3A-C could be implemented on a standalone interactive speaker that is equipped with a touchscreen display and that functions as an assistant device.

In FIG. 3A, the user may have either clicked on the microphone and spoken, or typed (e.g., in to message exchange client 113), the natural language input, "'Hypothetical' movie Louisville Friday, two tickets." In various implementations, this natural language input may be processed by various components of automated assistant 120 to identify the user's intent (purchase movie ticket) and one or more parameters (e.g., movie=Hypothetical, date=Friday, September 21, num_tickets=2) that are usable to carry out the intent.

Based on this data, automated assistant 120 may retrieve one or more web pages from the same interactive website, fakebooking.com, and begin using techniques described herein to automatically navigate through at least portions of the interactive website. The user's request did not include all necessary parameters for procuring a movie ticket. For example, the user did not state a specific time, theatre, or desired seats. Accordingly, in various implementations, the automated navigation of the fakebooking.com website may pause at selected web pages/interfaces to allow the user to provide any missing information.

In FIG. 3A, for instance, automated assistant 120 provides show times for the requested movie on the requested date. Similar to FIG. 2A, in FIG. 3A, the user can select a desired show time to proceed. In FIG. 3B, for instance, the user taps the microphone and speaks the phrase, "8:45 at 1$^{st}$ theatre." Alternatively, the user could have selected the link to the desired time similar as above. Either way, automated navigation of the interactive website may resume as far as possible until additional missing information is required.

The user also did not specify which seats he or she wanted. Accordingly, in response to the user's first statement in FIG. 3B, automated assistant 120 provides the output, "Please select your seats." Below that, automated assistant 120 provides an interactive seat selection interface that mimics or copies the same interactive element(s) from the interactive web page depicted in FIG. 2G. Once the user selects the same seats, a button may appear below that lists the selected seats (it could also simply say "Confirm" or "Next"). Clicking this button may resume automated navigation to the interface depicted in FIG. 3C.

In FIG. 3C, automated assistant 120 asks for the user to confirm the details of the purchase. This information may be compiled from the various parameters provided by the user and/or derived from a corresponding confirmation web page of the underlying website (e.g., FIG. 2I). The user confirms by orally replying, "Yep." Automated assistant 120 responds, "Enjoy the show," and then may provide some helpful links, such as a button to add the event to the user's calendar, a deep link to open a navigation application with directions preloaded, etc.

In some implementations, including this example, the user is asked to confirm the purchase. However, this is not always required. In some implementations, the purchase may go through automatically if there is sufficient confidence that it is the user's desire to complete the purchase. For example, if the user makes a particular type of purchase frequently and always confirms the purchase with little delay, eventually the user may cease being asked to confirm the purchase. Additionally or alternatively, in some implementations factors such as the price being paid, the type of product, and/or other signals may be considered in determining whether the ask the user to confirm the purchase. For example, if the price being paid is below some threshold that is presumed to be well within a user's spending comfort zone, that purchase may be confirmed automatically without further user input. Or, if there are other signals corroborating the purchase, such as calendar entries stating the user will be at an event for which the user is purchasing tickets, emails with friends saying something similar, or the user has purchased other items related to the event (e.g., hotel room, back stage passes, etc.), then the purchase may be confirmed automatically.

Figure 4B:
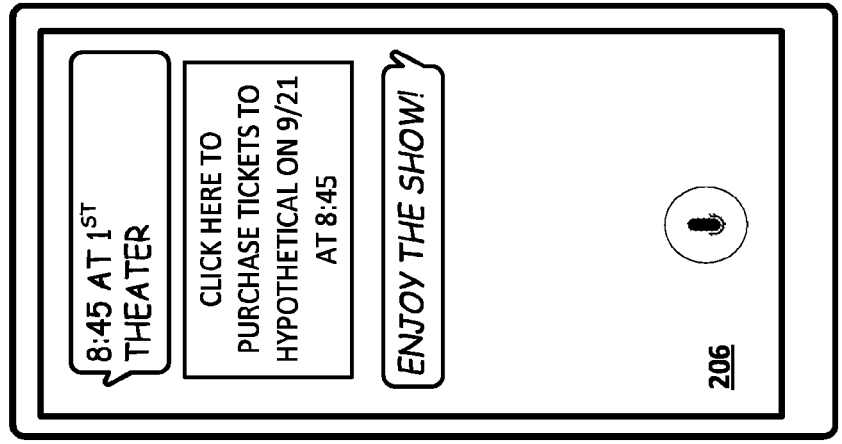
FIG. 4A and FIG. 4B depict another example of how the sequence of interactive web pages of FIGS. 2A-I may be at least automatically navigated using disclosed techniques.
Figure 4A:
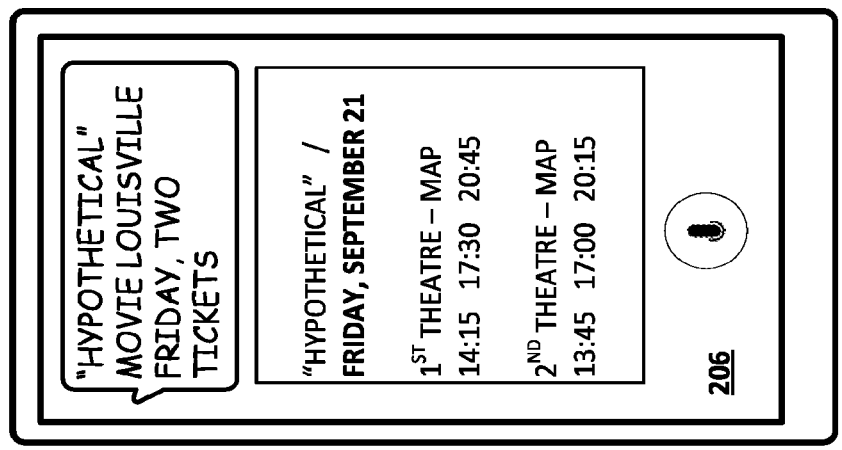

FIGS. 4A-B depict an alternative implementation in which the automated navigation of the interactive website of FIGS. 2A-I is able to streamline the user experience to a greater degree than in FIGS. 3A-C. In this example, the same client device 206 is depicted. However, the interactions between the user and automated assistant 120 in FIGS. 4A-B do not necessarily require a display interface. For example, rather than displaying show times as depicted in FIG. 4A, automated assistant 120 could audibly output the different theatres and show times. Consequently, the interaction depicted in FIGS. 4A-B could be implemented using an assistant device that does not even include a display, such as a standalone interactive speaker or a vehicular computing system (which may have a screen but may not use it to avoid distracting a driver).

FIG. 4A is substantially similar to FIG. 3A. Once the user selects a theatre and show time as depicted in FIG. 4B, in various implementations, automated assistant 120 may present a card that is selectable to complete the transaction. Or, in the alternative, if the interaction of FIGS. 4A-B is purely audible, then automated assistant 120 may audibly output the details and ask the user to confirm.

In FIGS. 4A-B, the seat selection chart is skipped. This may be for a variety of reasons. For example, the theatre or show time selected by the user may be open seating, in which case the seats are cannot be reserved, and instead are first come, first served. Alternatively, in some implementations, the user's preference for seats may be determined from the user's profile, e.g., based on manual input by the user or seating preferences of the user learned over time. Suppose the user always selects seat(s) between three and five rows back, and only selects the center section of the theatre. Suppose further that in past instances in which these seats were not available, the user did not purchase tickets or purchased the desired seats in a different show time. These signals may be used to learn the user's seat preferences. Accordingly, automated assistant 120 may analyze a seating chart to determine whether seats satisfying the user's seat preferences are available, and then may automatically select those seats. That way, the user need not select them himself or herself. Similar techniques may be employed to automatically select seats on airplanes, trains, sporting events, etc.

Figure 5:
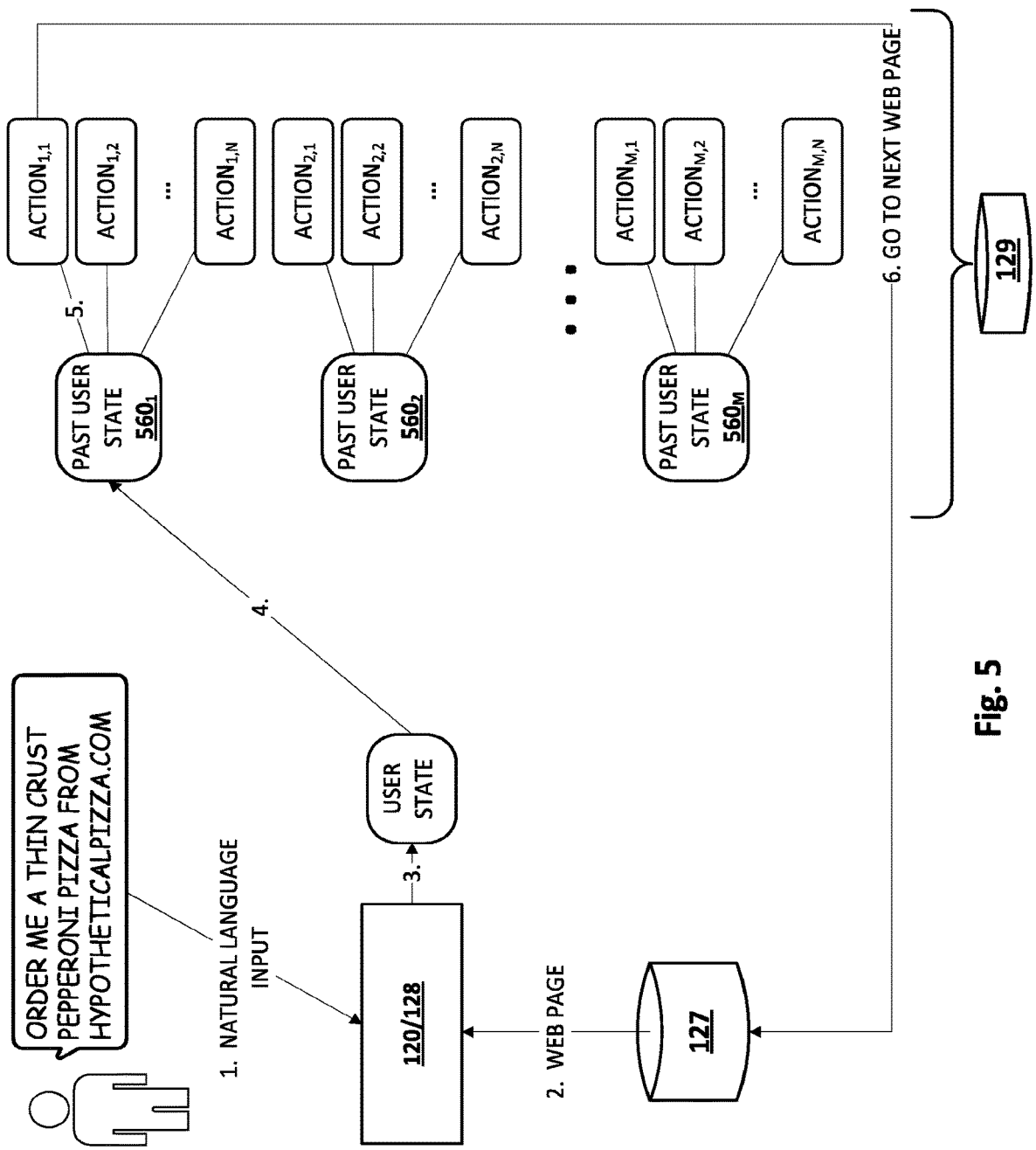
FIG. 5 schematically depicts one example of how techniques described herein may be used to automatically interact with a given interactive web page using natural language, in accordance with various implementations.

FIG. 5 depicts one example of how various components of FIG. 1 may be configured to automatically navigate through all or portions of interactive websites that include each one or interactive web pages. While in some implementations these techniques may be employed to allow automated assistant 120 to automatically navigate through interactive websites for which there is no corresponding third party agent (150), this is not meant to be limiting. Techniques described herein may be usable to automatically navigate through all or portions of interactive websites in other contexts. For example, web browser 111 could be equipped with a plugin that is configured to perform selected aspects of the present disclosure to facilitate automated website navigation. A user could operate the plugin while using web browser 111, e.g., by clicking on an icon that is displayed when web browser is navigated to an interactive website that was previously validated for automated navigation using techniques described herein. Clicking on the icon may autofill and/or submit as much of the information required from the website as possible, and then may allow the user to interact with individual interactive elements to provide missing information.

In step 1 of FIG. 5, the user provides a natural language input to automated assistant 120. In this example, the user asks, "Order me a thin crust pepperoni pizza from hypotheticalpizza.com." Assume that the interactive website at hypotheticalpizza.com does not have a corresponding third party agent (150). Automated assistant 120 may analyze the user's request to determine that the user's intent is to order pizza from hypotheticalpizza.com, and that automated assistant 120 should fulfill the order using the parameters "pepperoni" and "thin crust."

Based on the analysis, at step 2, automated assistant 120 and/or website navigation engine 128 may retrieve, e.g., from web page database(s) 127, the opening interactive web page of the website at the requested network identifier (hypotheticalpizza.com). At step 3, a current user state may be generated based at least in part on the retrieved opening web page, and/or based on other information such as the user's preferences, calendar, etc. As noted previously, this current user state may take various forms, such as a feature vector, a semantically-rich embedding, etc. In some cases, the web page content may be analyzed to generate one or more universal identifier matrices based on one or more interactive elements of the web page. Data indicative of these universal identifier matrices may be included in the user state.

At step 4, the user state may be matched to one or more candidate past user states $560_{1\text{-}M}$ contained in past user states database 129 (M is a positive integer). This matching may be based on various criteria, such as a similarity measure between the current user state and each of the candidate past user states 560. For example, in some implementations, only those candidate past user states 550 with similarity measures to the current user state that satisfy a threshold may be selected, or the top most similar candidate past user states may be selected. Or, respective universal identifier matrices of the candidate past user state and the current user state may be matched.

It is not necessary that a candidate past user state have been generated from the same web site as the current user state. In many cases, it may be enough that the candidate past user state was generated from a functionally similar web page, such that similar actions would be successful whether performed on the functionality similar web page or the web page used to generate the current user state. In this way it is possible, in some implementations, for website navigation engine 128 to automatically navigate through portions of heretofore unknown or un-encountered websites based on their similarities with known websites for which scripts have been previously validated.

As depicted in FIG. 5, each candidate past user state 560 may be associated with one or more actions. For example, first candidate past user state $560_1$ is associated with ACTION 1, 1, ACTION 1, 2, . . . , and ACTION 1,N (N is a positive integer). Second candidate past user state $560_2$ is associated with ACTION 2, 1, ACTION 2, 2, . . . , and ACTION 2,N, and so on. Each action may correspond to, for instance, an interactive web page element. In some implementations, each action may be represented by a universal identifier matrix generated from a particular interactive element encountered on a web page in the past. Thus, an action could include, for instance, input a parameter into a text field, select a parameter from a drop down list, check a radio button or check box, toggle a toggle switch, activate a "submit" or "confirm" or "next" button, etc.

At step 5, one or more actions may be selected based on various criteria and performed. If successful, the next web page in the script through the interactive website may be loaded at step 6 and the process may be repeated. If the selected action is unsuccessful, then another action may be selected, until some action is successful. In some implementations, when an action is successful, the current user state may be added to past user states database 127, e.g., in association with at least the successful action. In this manner, the system "learns" how to automatically navigate through interactive websites and/or is able to validate/revalidate known scripts through interactive websites.

In the example of FIG. 5, every candidate past user state 560 has N potential actions. This may be because, for instance, all possible actions are made available for each candidate past user state 560. In various implementations, one or more policies may dictate which actions are attempted, or in what order the actions are attempted. In some such implementations, all the actions 1-N may be ranked, e.g., pursuant to one or more policies, based on various criteria, such as a similarity between their respective universal identifier matrices (which as noted above may be associated with past user states and/or their associated actions). However, this is not meant to be limiting. In some implementations, each past user state 560 may be associated only with those actions that correspond with interactive elements (and hence, universal identifier matrices) that are found in the underlying web pages used to generate those past user states. This in effect reduces the search space of potential actions for a given candidate past user state.

Other policies are contemplated herein. For example, in some implementations, the state/actions may be governed by a policy that evolves over time, e.g., akin to reinforcement learning. For example, the policy may take the form of a neural network or other statistical model that is trained to receive, as input, the current user state, and to provide, as output, data indicative of which action should be performed first, second, etc. For example, the output could be probabilities that each potential action will be successful. In some implementations, the action(s) most likely to be successful may be performed, e.g., in order of their probabilities of success.

In some implementations, the policy may be continuously trained each time an interactive website is successfully navigated, whether by a human or automatically using techniques described herein. For example, each web page in a sequence of web pages that are operated to navigate through an interactive website may be used to generate a state. The interaction with the website may be broken into "turns." During each turn, an action may be selected and performed based on the policy and the current user state to interact with an interactive element of the new web page. If a series of turns through web pages of an interactive website are successful, then a cumulative reward could be generated and used to train the policy for each current user state/action pair of each turn. For example, the cumulative reward could be used to perform techniques such as gradient descent and/or back propagation on the policy for each user state/action performed. Over time, the policy may become better at selecting actions based on current user states in order to successfully automatically navigate through interactive websites.

Additionally or alternatively, in some implementations, a separate, per-turn reward (or penalty) may be incurred, e.g., if the selected action is unsuccessful. For example, if a performed action includes an attempt to fill a credit card number field with a date, the underlying website may issue a warning (e.g., using JavaScript) that the input is invalid. This may constitute a failure of that action, which may cause a per-turn penalty to be incurred and used to train the policy, e.g., as a negative training example. Similarly, a positive per-turn reward could be incurred when an action is successful.

Figure 6A:
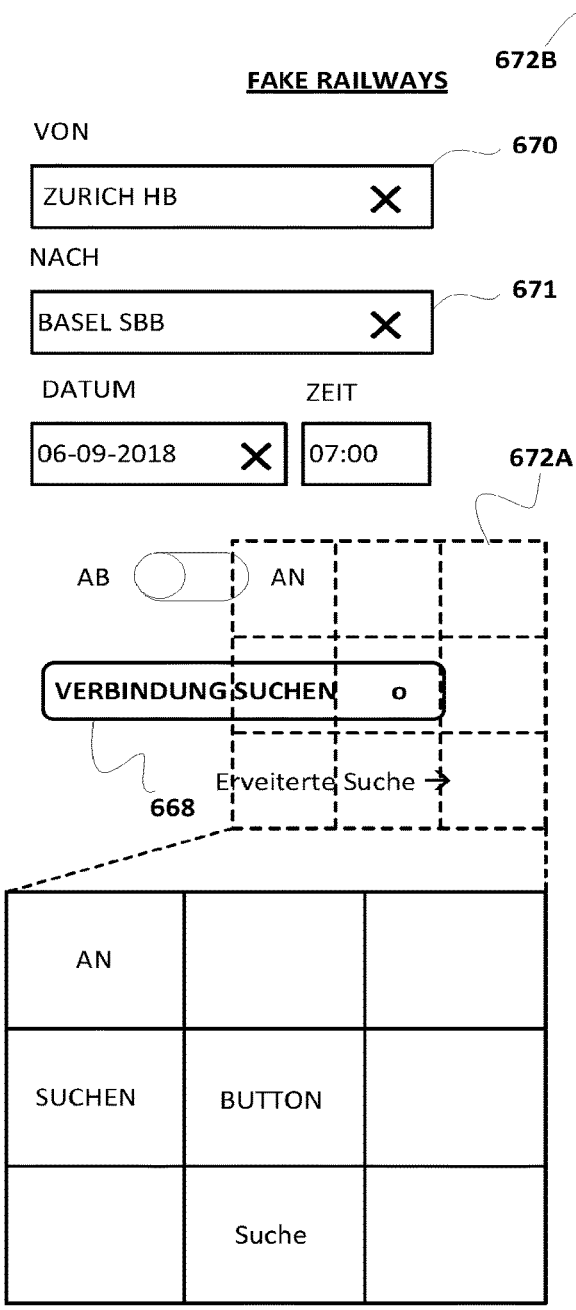
FIG. 6A and FIG. 6B depict examples of how universal identifier matrices may be generated from interactive elements of web pages, in accordance with implementations disclosed herein.
Figure 6B:
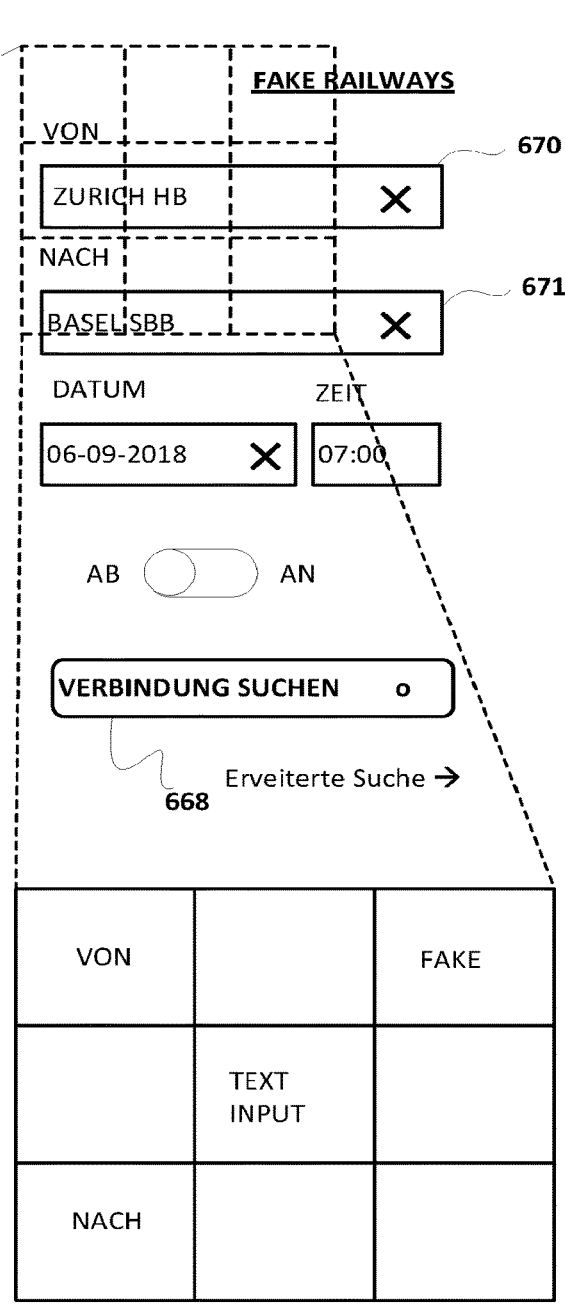

FIGS. 6A-B demonstrate two examples of how universal identifier matrices may be generated, in accordance with various implementations. In FIGS. 6A-B, a user interface for FAKE RAILWAYS is depicted. This interface may be operable by a user to book a train ticket. For example, a user may type or otherwise input the origin ("Von" translates to "From" in English) of his or her desired ticket in input box 670. The user may type or otherwise input the destination ("Nach") of his or her desired ticket in input box 671. And so on. Once the user has provided input for the various interactive elements, the user can look for available tickets by pressing button 668. Notably, the text in the interface of FIGS. 6A-B is in German. However, even a non-German speaker likely could intuit what each of the interactive elements represents based on the fact that those interactive elements have visual and/or geometrical contexts that are likely familiar from other, similar websites, e.g., websites to purchase airline tickets.

Accordingly, in various implementations, techniques described may be employed to generate, for each interactive element of the interface (i.e. web page), a universal identifier matrix 672A, 672B that includes data indicative of both the respective interactive element and of other visible content of the web page/interface that immediately surrounds the respective interactive element when the web page is rendered. More generally, universal identifier matrices act as selectors for HTML/XML nodes based on their geometrical contexts and types such that they can be easily retrieved from a web page even if the web page structure and/or DOM tree change significantly. In some implementations, a node of a recently-altered web page retrieved using its universal selector matrix may have the same type (e.g., radio button, text input, etc.) and may be capable of receiving the same actions as the original node.

One "grid-based" approach for generating universal identifier matrices is depicted in FIGS. 6A-6B. In FIG. 6A, a first universal identifier matrix 672A is generated for button 668. First universal identifier matrix 672A includes nine cells in a three-by-three arrangement. Each cell may have a predetermined width and/or height, which may be altered as needed/desired. Other numbers, sizes, and/or arrangements of cells are contemplated herein, such as five-by-five, nine-by-nine, etc. First universal selector 672A is centered on (and thus, captures) an active portion of button 668. As shown in the blown up version of first universal identifier matrix 672A at bottom, the top left cell captures the text "AN" from the interface, the middle left cell captures the text "SUCHEN" from the interface, and the bottom middle cell captures the text "SUCHE" from the interface. In some implementations, only whole words that are entirely captured by a cell may be included in the universal identifier matrix, although this is not required.

In FIG. 6B, a second universal identifier matrix 672B is centered on text input 670 ("VON"). As shown in the blown up version of second universal identifier matrix 672B at bottom, the top left cell captures the text "VON" from the interface, the top right cell captures the text "FAKE" from the interface, and the bottom left cell captures the text "NACH" from the interface.

These universal identifier matrices 672A-B, as well as universal identifier matrices generated for other interactive elements of the interface depicted in FIGS. 6A-B, may be stored, e.g., in database of past user states 127. For example, each past user state may include data indicative of these universal identifier matrices. Additionally or alternatively, these universal identifier matrices may be used to define actions that may be performed with those past user states. As described previously, when the interface of FIGS. 6A-B is encountered during automated navigation of the website associated with FAKE RAILWAYS, parameters provided by a user (up front as part of the natural language input or later) may be used to attempt to interact with the interactive elements that underlie these universal identifier matrices.

In some implementations, a particular DOM node (or more generally, interactive element) may be searched for in a given web page (or webview) as follows. A reference universal matrix generated from the sought-after node may be retrieved. A first universal matrix may be generated that captures the entire web page (i.e., covers the whole web page). Then, for each cell of this first universal matrix, another smaller universal identifier matrix may be generated that is centered in the cell and fits the entire cell. Then, the process may loop through each of the smaller universal identifier matrices to find the closest smaller universal identifier matrix to the reference universal identifier matrix. Then, the process may loop through all DOM nodes found within the closest smaller universal identifier matrix to identify the DOM node having the same type as the reference universal identifier matrix.

In some implementations of this "grid-based" approach, similarity between universal identifier matrices may be determine based on distances between them. For example, the "distance" between two grid-based universal identifier matrices can be computed from the set of terms by summing up their differences over the grid cells. Example pseudocode for determining a distance between two universal identifier matrices under the "grid-based" approach is depicted in FIG. 7. Note that distances can be computed between universal identifier matrices of different grid sizes. In some implementations, the following line of code in FIG. 7, "distance+=SetDiff(Ny.GetTerms(i), Nx.GetTerms(j)).size;" may be replaced by the following code:

```
const auto& set_diff=SetDiff(Ny.GetTerms(i), Nx.GetTerms(j));
for (const auto& term: set_diff) {
    Distance+=idf[term];
}
```

This change may make the distance measurement more robust to term changes by using the Inverse Document Frequency (idf). In the replacement code above, idf is a map from a string to the log(|D|/|D(term)|) where |D| is the number of universal identifier matrices and |D(term)| is the number of universal identifier matrices having the term as text in a cell that surrounds the center cell.

One benefit of the grid-based approach to generating universal identifier matrices, as demonstrated in FIGS. 6A-B, is that it scales linearly with the number of cells in the grid. However, other approaches for generating universal identifier matrices are contemplated herein. For example, in some implementations, universal identifier matrices may be defined as a set of <location, text> pairs associated with a given interactive element. <location> may be the position relative to the center of a bounding rectangle (or other shape) that is centered on the interactive element of interest. Each element surrounding the interactive of element of interest may be classified by its location relative to the interactive element. For example, <(−10, 10): "first", "name"> may refer to the text "first name" being located ten pixels (or other distance unit) to the left, and ten pixels (or other distance unit) above, the interactive element of interest. When comparing two universal identifier matrices constructed in this way, the distances between the various pairs may be computed to determine an overall similarity between the two universal identifier matrices. This approach may offer a more precise representation of a geometrical/visual context of an interactive element, albeit with an increase in computational complexity. Example pseudocode for such an approach is depicted in FIG. 8.

Figure 9:
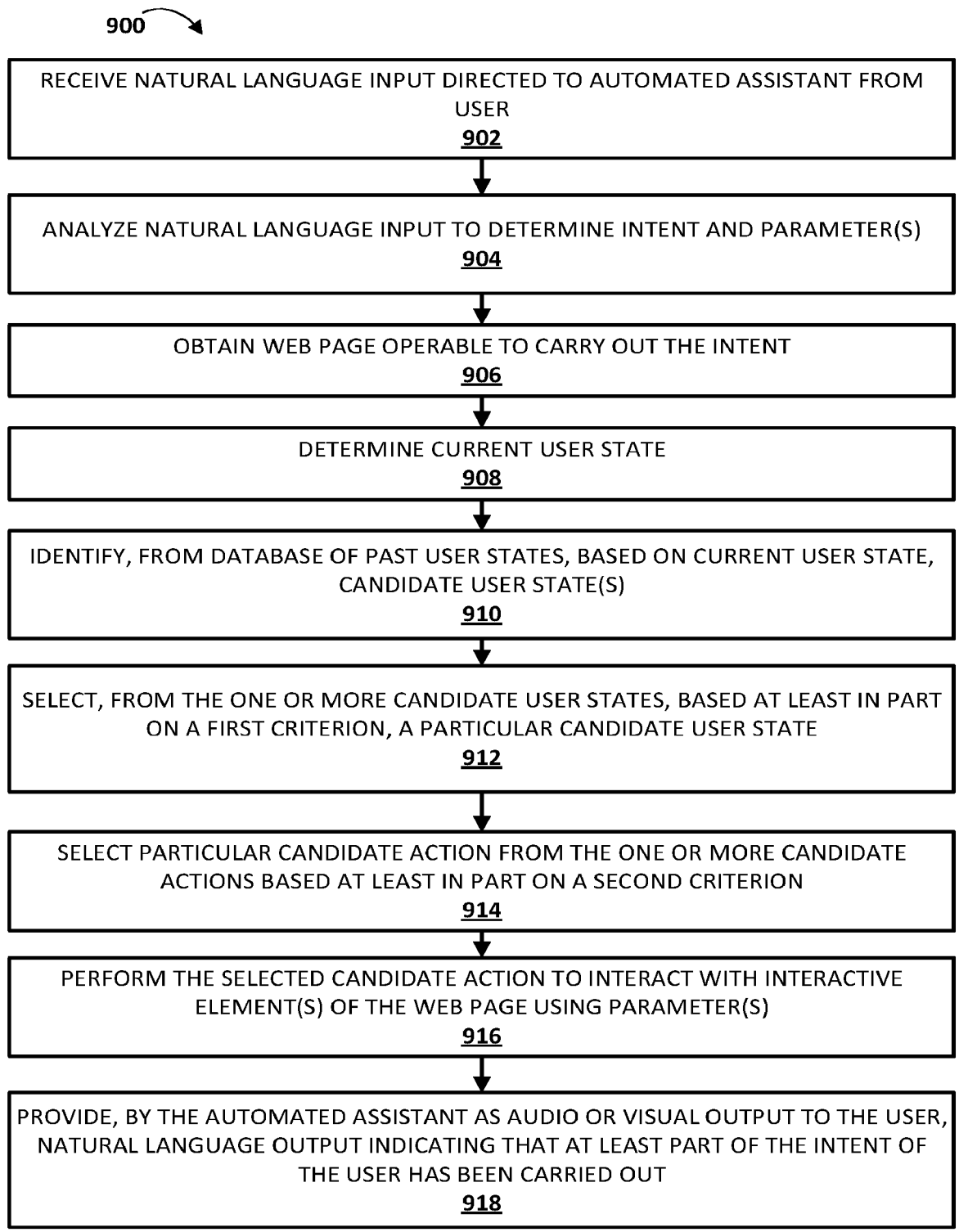
FIG. 9 depicts a flowchart illustrating an example method according to implementations disclosed herein.

FIG. 9 is a flowchart illustrating an example method 900 according to implementations disclosed herein. For convenience, the operations of the flow chart are described with reference to a system that performs the operations. This system may include various components of various computer systems, such as one or more components of automated assistant 120 and/or website navigation engine 128. Moreover, while operations of method 900 are shown in a particular order, this is not meant to be limiting. One or more operations may be reordered, omitted or added.

At block 902, the system may receive a natural language input from a user at an input component of a computing device (e.g., client devices 106, 206). In various implementations, the natural language input may be directed by the user to automated assistant 120 that operates at least in part (e.g., by way of automated assistant client 108) on the computing device. At block 904, the system, e.g., by way of cloud-based automated assistant components 119, may analyze the natural language input to identify an intent of the user and one or more parameters associated with carrying out the intent of the user.

At block 906, the system may obtain a web page that includes one or more interactive elements. In some implementations, the web page may be identified based on one or more of the natural language input, the intent of the user, or the one or more parameters For example, the web page may be operable to carry out the intent of the user. The one or more interactive elements may be operable to input one or more of the parameters.

At block 908, the system may determine a current user state associated with the user. As noted previously, the current user state (and any user state, generally) may be represented by various types of data structures, such as feature vectors, embeddings, one or more universal identifier matrices, etc. In various implementations, the current user state may be determined based at least in part on content of the web page, including its constituent interactive elements.

At block 910, the system may identify, e.g., from database of past user states 127, based on the current user state determined (e.g., generated) at block 908, one or more candidate past user states (e.g., $560_{1-M}$). In some implementations, each of the one or more candidate past user states may include, for instance, one or more candidate actions for interacting with one or more of the interactive elements of the web page. In some implementations, the one or more candidate actions may have been previously validated as capable of carrying out at least part of the intent.

At block 912, the system may select, from the one or more candidate past user states, based at least in part on a first criterion, a particular candidate past user state. Various first criteria may be employed, such as similarity measures (e.g., distances) between the two states, similarity measures (e.g., distances) between their constituent universal identifier matrices, etc. At block 914, the system may select, from the one or more candidate actions associated with the particular candidate past user state, based at least in part on a second criterion, a particular candidate action. For example, the system may select an action of the past user state that is represented by a universal identifier matrix that is most similar to a universal identifier matrix generated from an interactive element of the web page used to generate the current user state.

At block 916, the system may perform the selected candidate action to interact with one or more of the interactive elements of the web page using one or more of the parameters. For example, one parameter may be used to select from a drop down menu, another parameter may be used to populate a text input field, etc. At block 918, the system may provide, e.g., by way of automated assistant 120 as audio or visual output to the user, natural language output indicating that at least part of the intent of the user has been carried out.

Figure 10:
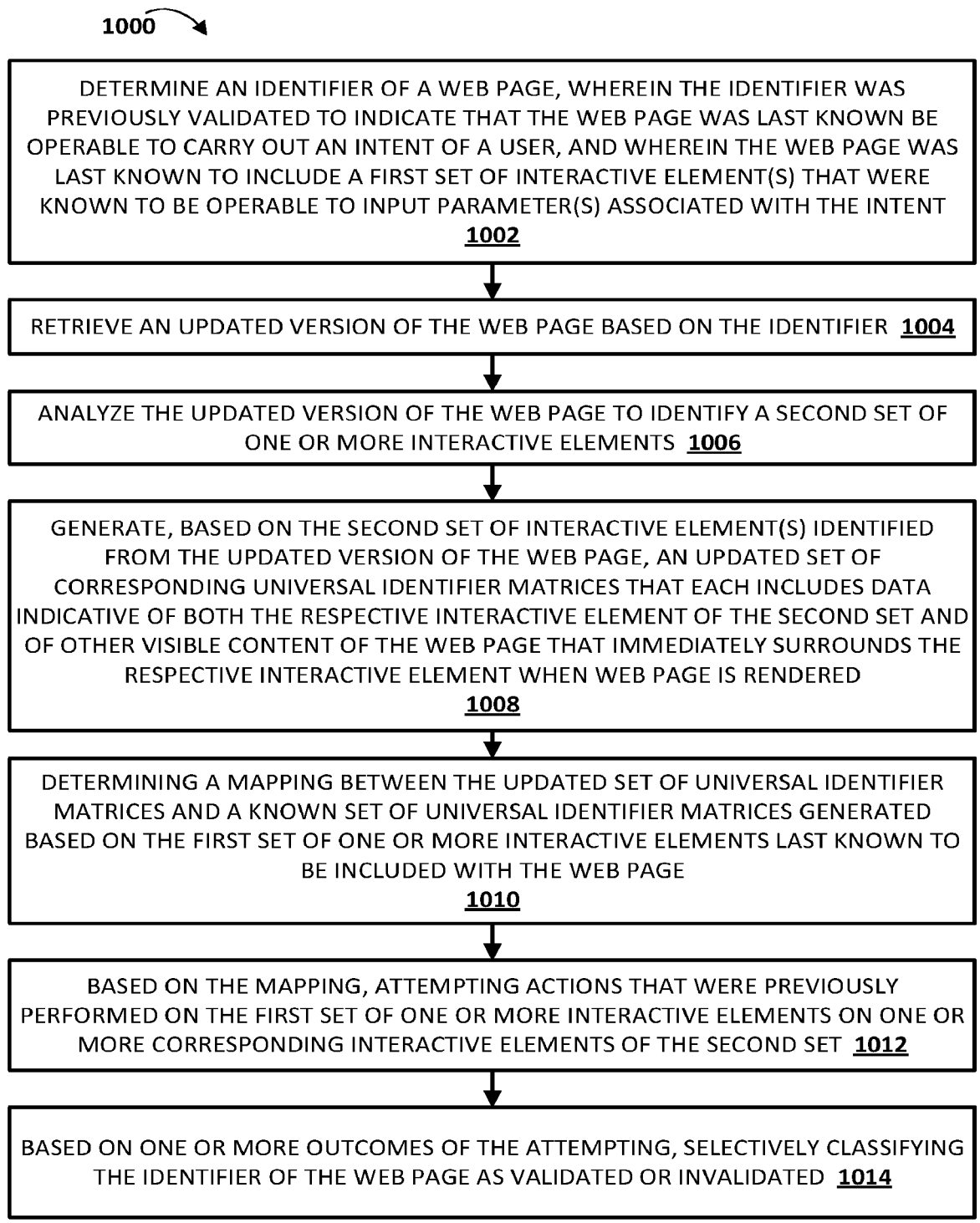
FIG. 10 depicts a flowchart illustrating another example method according to implementations disclosed herein.

FIG. 10 depicts an example method 1000 for practicing selected aspects of the present disclosure, in accordance with various embodiments. In particular, method 100 may be performable to re-validate previously validated web pages/websites, e.g., in case those web pages have been changed. For convenience, the operations of the flow chart are described with reference to a system that performs the operations. This system may include various components of various computer systems, including automated assistant 120 and/or website navigation engine 128. Moreover, while operations of method 1000 are shown in a particular order, this is not meant to be limiting. One or more operations may be reordered, omitted or added.

At block 1002, the system may determine an identifier of a web page, such as a URL, domain, IP address, etc. In various implementations, the identifier may have been previously validated to indicate that the web page was last known be operable to carry out an intent of a user. In various implementations, the web page may have been last known to include a first set of one or more interactive elements that were known to be operable to input one or more parameters associated with the intent.

At block 1004, the system may retrieve (e.g., download) an updated version of the web page based on the identifier. At block 1006, the system may analyze the updated version of the web page retrieved at block 1004 to identify a second set of one or more interactive elements. At block 1008, the system may generate, based on the second set of one or more interactive elements identified from the updated version of the web page retrieved at block 1004, an updated set of corresponding universal identifier matrices. Each of the updated set may include data indicative of both the respective interactive element of the second set and of other visible content of the web page that immediately surrounds the respective interactive element when the web page is rendered.

At block 1010, the system may determine a mapping between the updated set of universal identifier matrices and a known set of universal identifier matrices generated based on the first set of one or more interactive elements last known to be included with the web page. Put another way, the system attempts to reconcile interactive elements of the updated web page with interactive elements of the prior version of the web page, e.g., using past user states and other information available in past user state database 129.

At block 1012, the system may, based on the mapping, attempt action(s) that were previously performed on the first set of one or more interactive elements on one or more corresponding interactive elements of the second set. Put another way, the system attempts the same actions that were validated previously to see if they still work, and to determine whether the mapping is legitimate.

Based on one or more outcomes of the attempting, at block 1014, the system may selectively classifying the identifier of the web page as validated or invalidated. For example, if the same actions were successful on the updated version of the website, those actions (e.g., forming part of a script through the interactive website) may be deemed validated. Consequently, the system may make the newly-validated identifier available as part of a plurality of validated web page identifiers (corresponding to validated past user states) that are available to facilitate natural language-based automated navigation through websites that include web pages associated with the validated web page identifiers.

Figure 11:
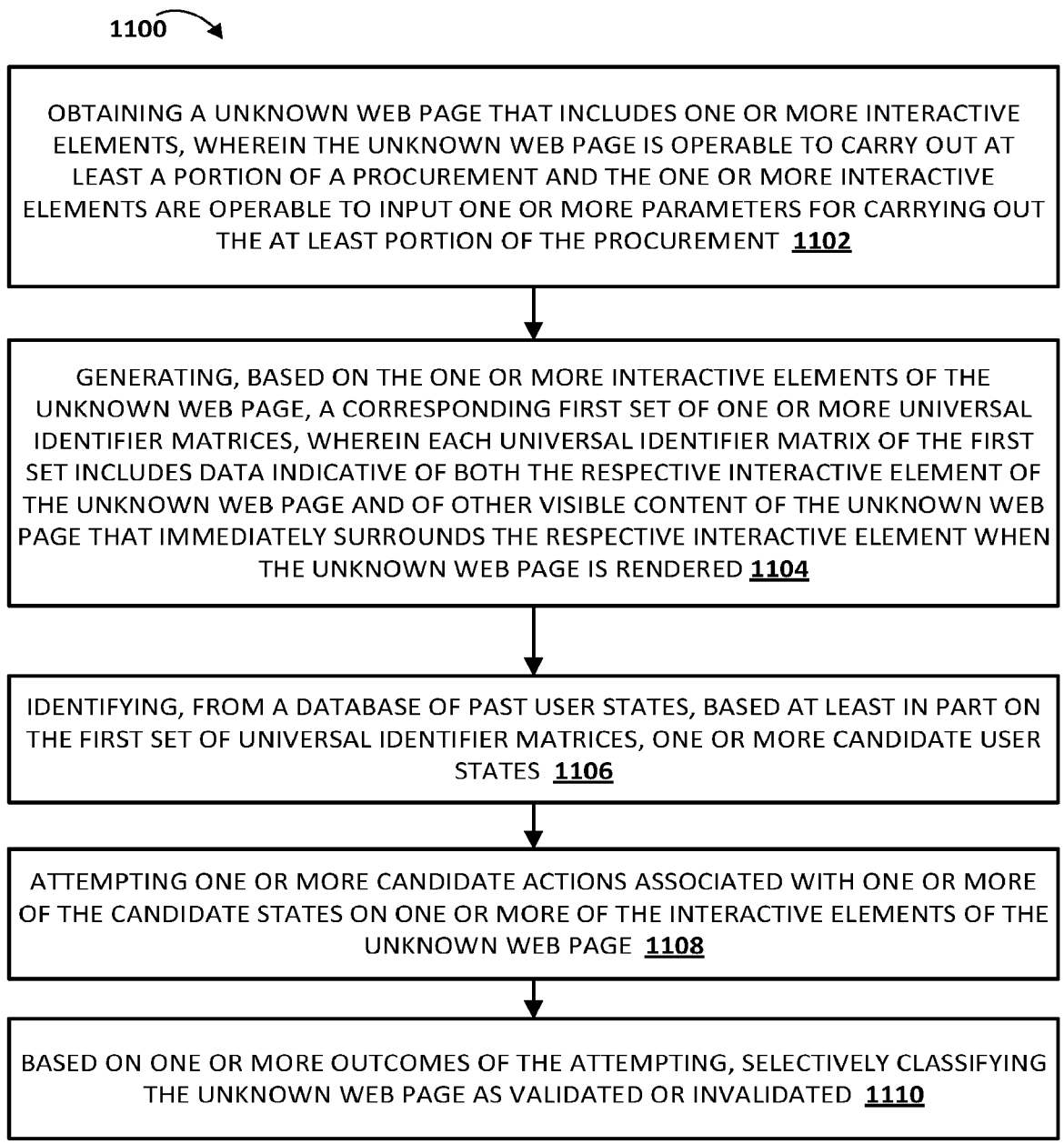
FIG. 11 depicts a flowchart illustrating another example method according to implementations disclosed herein.

FIG. 11 depicts an example method 1100 for practicing selected aspects of the present disclosure, in accordance with various embodiments. In particular, the operations of FIG. 11 may be used to analyze heretofore unknown interactive websites in order to facilitate automated navigation through those websites. For convenience, the operations of the flow chart are described with reference to a system that performs the operations. This system may include various components of various computer systems, including automated assistant 120 and/or website navigation engine 128. Moreover, while operations of method 1100 are shown in a particular order, this is not meant to be limiting. One or more operations may be reordered, omitted or added.

At block 1102, the system may obtain, e.g., based on a website identifier provided by a user, an unknown web page that includes one or more interactive elements. The unknown web page may be operable to carry out at least a portion of a procurement (e.g., purchasing a good or service) and the one or more interactive elements may be operable to input one or more parameters for carrying out the at least portion of the procurement.

At block 1104, the system may generate, e.g., based on the one or more interactive elements of the unknown web page, a corresponding first set of one or more universal identifier matrices. As described previously, each universal identifier matrix of the first set may include data indicative of both the respective interactive element of the unknown web page and of other visible content of the unknown web page that immediately surrounds the respective interactive element when the unknown web page is rendered.

At block 1106, the system may identify, e.g., from database of past user states 127, based at least in part on the first set of universal identifier matrices, one or more candidate past user states. Once again these may be identified using various criteria, such as overall (e.g., web page-wide) similarity/distance or similarity/distance between individual interactive elements (or between universal identifier matrices generated therefrom). As in previously-described implementations, each respective candidate past user state of the one or more candidate past user states may include one or more candidate actions for interacting with one or more interactive elements of a known web page used to generate the respective candidate past user state. And in various implementations, a given candidate past user state of the one or more candidate past user states may be identified based on a comparison of the first set of universal identifier matrices and a second set of one or more universal identifier matrices associated with the given candidate past user state.

At block 1108, the system may attempt one or more candidate actions associated with one or more of the candidate past user states on one or more of the interactive elements of the unknown web page. If method 1100 is being performed automatically to facilitate future automated navigation of an unknown website, in some implementations, the constituent web pages of the unknown website may be downloaded to a test system (e.g., a sandbox), and dummy values may be used as parameters for testing purposes. At block 1110, the system may, based on one or more outcomes of the attempting, selectively classifying the unknown web page as validated or invalidated. As before, validated web pages may be available to facilitate natural language-based auto-mated navigation through websites that include the validated web pages.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Figure 12:
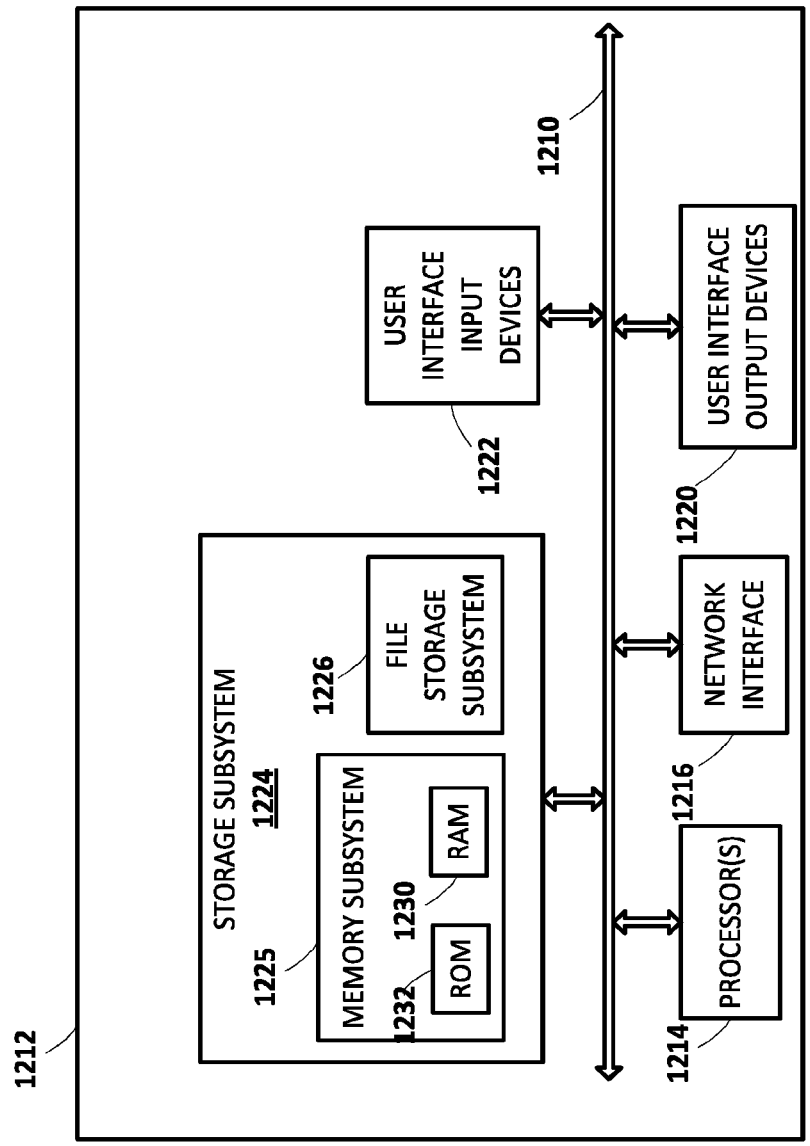
FIG. 12 illustrates an example architecture of a computing device.

FIG. 12 is a block diagram of an example computing device 1210 that may optionally be utilized to perform one or more aspects of techniques described herein. In some implementations, one or more of a client computing device, website navigation engine 128, automated assistant 120, and/or other component(s) may comprise one or more components of the example computing device 1210.

Computing device 1210 typically includes at least one processor 1214 which communicates with a number of peripheral devices via bus subsystem 1212. These peripheral devices may include a storage subsystem 1224, including, for example, a memory subsystem 1225 and a file storage subsystem 1226, user interface output devices 1220, user interface input devices 1222, and a network interface subsystem 1216. The input and output devices allow user interaction with computing device 1210. Network interface subsystem 1216 provides an interface to outside networks and is coupled to corresponding interface devices in other computing devices.

User interface input devices 1222 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1210 or onto a communication network.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1210 to the user or to another machine or computing device.

Storage subsystem 1224 stores programming and data constructs that provide the functionality of some or all of the modules described herein. For example, the storage subsystem 1224 may include the logic to perform selected aspects of the method of FIGS. 7-9, as well as to implement various components depicted in FIG. 1.

These software modules are generally executed by processor 1214 alone or in combination with other processors. Memory 1225 used in the storage subsystem 1224 can include a number of memories including a main random access memory (RAM) 1230 for storage of instructions and data during program execution and a read only memory (ROM) 1232 in which fixed instructions are stored. A file storage subsystem 1226 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1226 in the storage subsystem 1224, or in other machines accessible by the processor(s) 1214.

Bus subsystem 1212 provides a mechanism for letting the various components and subsystems of computing device 1210 communicate with each other as intended. Although bus subsystem 1212 is shown schematically as a single bus, alternative implementations of the bus subsystem may use multiple busses.

Computing device 1210 can be of varying types including a workstation, server, computing cluster, blade server, server farm, or any other data processing system or computing device. Due to the ever-changing nature of computers and networks, the description of computing device 1210 depicted in FIG. 12 is intended only as a specific example for purposes of illustrating some implementations. Many other configurations of computing device 1210 are possible having more or fewer components than the computing device depicted in FIG. 12.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    determining an identifier of a web page, wherein the identifier was previously validated to indicate that the web page was last known to be operable to carry out an intent of a user, and wherein the web page was last known to include a first set of one or more interactive elements that were known to be operable to input one or more parameters associated with the intent;
    retrieving a latest version of the web page using the identifier;
    analyzing the updated version of the web page to identify a second set of one or more interactive elements;
    generating a first set of universal identifier matrices, wherein the generating includes, for each interactive element of the identified second set, generating a respective universal identifier matrix comprising a two-dimensional grid of cells that semantically captures the interactive element and its surrounding visual context, wherein each cell of the two-dimensional grid has a predetermined width and height, and the generating includes:
        positioning the two-dimensional grid over the interactive element to spatially align the underlying interactive element with a central cell of the two-dimensional grid such that other pieces of content that surround the interactive element are overlaid by one or more other cells of the two-dimensional grid that are spatially adjacent the central cell, and
        including content that is captured spatially within each cell of the two-dimensional grid of cells in the universal identifier matrix;
    determining a reference set of universal identifier matrices generated based on the first set of one or more interactive elements previously known to be included with a prior version of the web page associated with the identifier;
    calculating similarity measures between the universal identifier matrices of the first set and each of the universal identifier matrices of the known set;
    based on the similarity measures, matching one or more universal identifier matrices of the first set to one or more universal identifier matrices of the known set;
    based on the matching, performing actions that were previously performed on the first set of one or more interactive elements on one or more corresponding interactive elements of the second set; and
    based on one or more outcomes of the performing, selectively classifying the identifier of the web page as validated or invalidated;
    wherein validated web page identifiers are flagged as available to facilitate natural language-based automated navigation through websites that include web pages associated with the validated web page identifiers, and invalidated web page identifiers are flagged as unavailable for natural language-based automated navigation or discarded.

2. The method of claim 1, wherein the identifier of the web page comprises a uniform resource locator ("URL").

3. The method of claim 1, wherein the validated web page identifiers are available to an automated assistant to facilitate the natural language-based automated navigation through the websites that include the web pages associated with the validated web page identifiers.

4. The method of claim 3, wherein the automated assistant facilitates the natural language-based automated navigation via spoken dialog with a user using a microphone and speaker.

5. The method of claim 4, wherein the natural language-based automated navigation is facilitated without rendering content on a display.

6. A method implemented using one or more processors, comprising:
- obtaining an unknown web page that includes one or more interactive elements, wherein the unknown web page is operable to carry out at least a portion of a procurement and the one or more interactive elements are operable to input one or more parameters for carrying out the at least portion of the procurement;
- generating a first set of universal identifier matrices, wherein the generating includes, for each interactive element of the one or more interactive elements, generating a respective universal identifier matrix comprising a two-dimensional grid of cells that semantically captures the interactive element and its surrounding visual context, wherein each cell of the two-dimensional grid has a predetermined width and height, and the generating includes:
  - positioning the two-dimensional grid over the interactive element to spatially align the underlying interactive element with a central cell of the two-dimensional grid such that other pieces of content that surround the interactive element are overlaid by one or more other cells of the two-dimensional grid that are spatially adjacent the central cell, and
  - including content that is captured spatially within each cell of the two-dimensional grid of cells in the universal identifier matrix;
- identifying, from a database of past user states, based at least in part on the one or more universal identifier matrices of the first set of universal identifier matrices, one or more candidate past user states,
  - wherein each respective candidate past user state of the one or more candidate past user states includes one or more candidate actions for interacting with one or more interactive elements of a known web page used to generate the respective candidate past user state, and
  - wherein a given candidate past user state of the one or more candidate past user states is identified based on matching one or more of the first set of universal identifier matrices to one or more reference universal identifier matrices associated with the given candidate past user state, wherein the matching is based on a similarity measure between one or more of the universal identifier matrices and one or more of the reference universal identifier matrices;
- attempting one or more candidate actions associated with one or more of the candidate past user states on one or more of the interactive elements of the unknown web page; and
- based on one or more outcomes of the attempting, selectively classifying the unknown web page as validated or invalidated;
- wherein validated web pages are flagged as available to facilitate natural language-based automated navigation through websites that include the validated web pages.

7. The method of claim 6, wherein the validated web pages are available to an automated assistant to facilitate the natural language-based automated navigation through the websites that include the validated web pages.

8. The method of claim 7, wherein the automated assistant facilitates the natural language-based automated navigation via spoken dialog with a user using a microphone and speaker.

9. The method of claim 8, wherein the natural language-based automated navigation is facilitated without rendering content on a display.

10. The method of claim 6, further comprising generating a new user state in response to classifying the unknown web page as validated.

11. The method of claim 8, wherein the new user state is generated based on the unknown web page and added to the database of past user states.

12. A system comprising one or more processors and memory storing instructions that, in response to execution by the one or more processors, cause the one or more processors to:
- determine an identifier of a web page, wherein the identifier was previously validated to indicate that the web page was last known to be operable to carry out an intent of a user, and wherein the web page was last known to include a first set of one or more interactive elements that were known to be operable to input one or more parameters associated with the intent;
- retrieve a latest version of the web page using the identifier;
- analyze the updated version of the web page to identify a second set of one or more interactive elements;
- generate a first set of universal identifier matrices, wherein the instructions to generate include instructions to, for each interactive element of the identified second set, generate a respective universal identifier matrix comprising a two-dimensional grid of cells that semantically captures the interactive element and its surrounding visual context, wherein each cell of the two-dimensional grid has a predetermined width and height, and the generating includes:
  - position the two-dimensional grid over the interactive element to spatially align the underlying interactive element with a central cell of the two-dimensional grid such that other pieces of content that surround the interactive element are overlaid by one or more other cells of the two-dimensional grid that are spatially adjacent the central cell, and
  - include content that is captured spatially within each cell of the two-dimensional grid of cells in the universal identifier matrix;
- determine a reference set of universal identifier matrices generated based on the first set of one or more interactive elements previously known to be included with a previous version of the web page associated with the identifier;
- calculate similarity measures between the universal identifier matrices of the first set and each of the universal identifier matrices of the known set;
- based on the similarity measures, match one or more universal identifier matrices of the first set to one or more universal identifier matrices of the known set;
- based on the matched universal identifier matrices, perform actions that were previously performed on the first set of one or more interactive elements on one or more corresponding interactive elements of the second set; and based on one or more outcomes of the perform actions, selectively classify the identifier of the web page as validated or invalidated;

wherein validated web page identifiers are flagged as available to facilitate natural language-based automated navigation through websites that include web pages associated with the validated web page identifiers, and invalidated web page identifiers are flagged as unavailable for natural language-based automated navigation or discarded.

13. The system of claim 12, wherein the identifier of the web page comprises a uniform resource locator ("URL").

14. The system of claim 12, wherein the validated web page identifiers are available to an automated assistant to facilitate the natural language-based automated navigation through the websites that include the web pages associated with the validated web page identifiers.

15. The system of claim 14, wherein the automated assistant facilitates the natural language-based automated navigation via spoken dialog with a user using a microphone and speaker.

16. The system of claim 15, wherein the natural language-based automated navigation is facilitated without rendering content on a display.

17. A system comprising one or more processors and memory storing instructions that, in response to execution by the one or more processors, cause the one or more processors to:

obtain an unknown web page that includes one or more interactive elements, wherein the unknown web page is operable to carry out at least a portion of a procurement and the one or more interactive elements are operable to input one or more parameters for carrying out the at least portion of the procurement;

generate a first set of universal identifier matrices, wherein the generating includes, for each interactive element of the one or more interactive elements, wherein the instructions to generate include instructions to generate a universal identifier matrix comprising a two-dimensional grid of cells that semantically captures the interactive element and its surrounding visual context, wherein each cell of the two-dimensional grid has a predetermined width and height, and the generating includes:

positioning the two-dimensional grid over the interactive element to spatially align the underlying interactive element with a central cell of the two-dimensional grid such that other pieces of content that surround the interactive element are overlaid by one or more other cells of the two-dimensional grid that are spatially adjacent the central cell, and including content that is captured spatially within each cell of the two-dimensional grid of cells in the universal identifier matrix;

identify, from a database of past user states, based at least in part on the one or more universal identifier matrices of the first set of universal identifier matrices, one or more candidate past user states, wherein each respective candidate past user state of the one or more candidate past user states includes one or more candidate actions for interacting with one or more interactive elements of a known web page used to generate the respective candidate past user state, and wherein a given candidate past user state of the one or more candidate past user states is identified based on matching one or more of the universal identifier matrices of the first set with one or more reference universal identifier matrices associated with the given candidate past user state, wherein the matching is based on a similarity measure between one or more of the universal identifier matrices and one or more of the reference universal identifier matrices;

attempt one or more candidate actions associated with one or more of the candidate past user states on one or more of the interactive elements of the unknown web page; and based on one or more outcomes of the attempted one or more candidate actions, selectively classify the unknown web page as validated or invalidated;

wherein validated web pages are flagged as available to facilitate natural language-based automated navigation through websites that include the validated web pages.

18. The system of claim 17, wherein the validated web pages are available to an automated assistant to facilitate the natural language-based automated navigation through the websites that include the validated web pages.

19. The system of claim 17, further comprising instructions to generate a new user state in response to classifying the unknown web page as validated.

20. The system of claim 19, wherein the new user state is generated based on the unknown web page and added to the database of past user states.

* * * * *